US012667996B2

(12) United States Patent
Larsson

(10) Patent No.: US 12,667,996 B2
(45) Date of Patent: Jun. 30, 2026

(54) METHOD FOR DRY-FORMING A CELLULOSE BOTTLE, CELLULOSE BOTTLE FORMING UNIT AND CELLULOSE BOTTLE

(71) Applicant: PulPac AB, Västra Frölunda (SE)

(72) Inventor: Ove Larsson, Västra Frölunda (SE)

(73) Assignee: PulPac AB, Västra Frölunda (SE)

(*) Notice: Subject to any disclaimer, the term of this patent is extended or adjusted under 35 U.S.C. 154(b) by 316 days.

(21) Appl. No.: 18/235,227

(22) Filed: Aug. 17, 2023

(65) Prior Publication Data

US 2024/0100735 A1 Mar. 28, 2024

(30) Foreign Application Priority Data

Sep. 27, 2022 (SE) .................................... 2251115-8

(51) Int. Cl.
*B27N 5/02* (2006.01)

(52) U.S. Cl.
CPC ...................................... *B27N 5/02* (2013.01)

(58) Field of Classification Search
CPC ......... B27N 5/02; B29C 43/02; B29C 51/087; B29C 51/20; B29C 51/28; B29C 49/0005;
(Continued)

(56) References Cited

U.S. PATENT DOCUMENTS 1,192,202 A 7/1916 Johnson et al.
4,151,024 A 4/1979 Ohlsson
5,155,980 A * 10/1992 Mansson ............. B29C 66/1122 53/551

FOREIGN PATENT DOCUMENTS

EP 4043353 A1 8/2022
GB 1553177 A 9/1979
(Continued)

OTHER PUBLICATIONS

International Search Report and Written Opinion for Application No. PCT/EP2023/066247, dated Oct. 25, 2023.
(Continued)

*Primary Examiner* — Yunju Kim
(74) *Attorney, Agent, or Firm* — Sage Patent Group

(57) ABSTRACT

A bottle forming unit and method for dry-forming a cellulose bottle from an air-formed cellulose blank structure in a bottle forming unit. The dry-formed cellulose bottle comprises a neck portion, a closed bottom portion, and a mid-portion arranged between the closed bottom portion and the neck portion. The mid-portion is arranged in fluid communication with the neck portion. The dry-formed cellulose blank structure is shaped into a shaped cellulose blank structure, where the shaped cellulose blank structure has a tube-like configuration with an inner surface and an outer surface. A first section of the shaped cellulose blank structure is fed to a first forming mould and a semi-closed bottom portion of the cellulose bottle is formed from the first section in the first forming mould, simultaneously with forming the neck portion of a directly preceding cellulose bottle from the first section in the first forming mould. A following second section of the shaped cellulose blank structure is fed to the first forming mould and the neck portion of the cellulose bottle is formed from the second section in the first forming mould, simultaneously with forming a semi-closed bottom portion of a directly following cellulose bottle from the second section in the first forming mould.

8 Claims, 19 Drawing Sheets

(58) Field of Classification Search
CPC ........... B29C 49/22; B29C 49/58; B30B 5/02; B31B 50/36; B31B 50/592; B31B 50/594; B31B 50/741; B31F 1/0083
See application file for complete search history.

(56) References Cited

FOREIGN PATENT DOCUMENTS

| | | | |
|---|---|---|---|
| SE | 1750313 | A1 | 9/2018 |
| WO | WO-2017160218 | A1 | 9/2017 |
| WO | WO-2021183877 | A1 | 9/2021 |

OTHER PUBLICATIONS

International Search Report and Written Opinion for Application No. PCT/EP2023/076428, dated Feb. 5, 2024.
Office Action in corresponding Swedish application No. SE225115-8, dated Mar. 20, 2023.
Non-Final Office Action mailed Jul. 21, 2025 for U.S. Appl. No. 18/373,187, 7 pages.

* cited by examiner

METHOD FOR DRY-FORMING A CELLULOSE BOTTLE, CELLULOSE BOTTLE FORMING UNIT AND CELLULOSE BOTTLE

TECHNICAL FIELD

The present disclosure relates to a method for dry-forming a cellulose bottle from an air-formed cellulose blank structure in a bottle forming unit. The disclosure further relates to a bottle forming unit for dry-forming a cellulose bottle from an air-formed cellulose blank structure and a dry-formed cellulose bottle.

BACKGROUND

Cellulose fibres are commonly used as raw material for producing or manufacturing cellulose products. Products formed of cellulose fibres can be used in many different situations where there is a need for sustainable products. A wide range of products can be produced from cellulose fibres and one specific product category relates to cellulose bottles.

Bottle forming units are used when manufacturing cellulose bottles from raw materials including cellulose fibres, and traditionally cellulose products have been produced by wet-forming methods. A material commonly used for wet-forming cellulose fibre products, such as cellulose bottles is wet moulded pulp. Wet-formed products are generally formed by immersing a suction forming mould into a liquid or semi liquid pulp suspension or slurry comprising cellulose fibres, and when suction is applied, a body of pulp is formed with the shape of the desired product by fibre deposition onto the forming mould. With all wet-forming methods, there is a need for drying of the wet moulded product, where the drying process is a time and energy consuming part of the production. The demands on aesthetical, chemical and mechanical properties of cellulose products are increasing, and due to the properties of wet-formed cellulose products, the mechanical strength, flexibility, freedom in material thickness, and chemical properties are limited. It is also difficult in wet-forming processes to control the mechanical properties of the products with high precision.

One development in the field of producing cellulose products, such as cellulose bottles, is dry-forming of cellulose products without using wet-forming methods. Instead of forming the cellulose products from a liquid or semi liquid pulp suspension or slurry, an air-formed cellulose blank structure is used. The air-formed cellulose blank structure is inserted into a forming mould and during the dry-forming of the cellulose products, the cellulose blank is subjected to a high forming pressure and a high forming temperature. One difficulty with bottle dry-forming methods is the problem with an efficient production process, where cellulose bottles with high quality can be produced at high speeds. The handling of the air-formed cellulose blank structure is a complicated and time consuming process when dry-forming the cellulose bottles, and there is a need for producing bottles with high finish at increased production rates, and thus a more efficient bottle forming unit and method for producing high-quality cellulose bottles is desired.

SUMMARY

An object of the present disclosure is to provide a method for dry-forming a cellulose bottle, a cellulose bottle forming unit, and a dry-formed cellulose bottle, where the previously mentioned problems are avoided. This object is at least partly achieved by the features of the independent claims. The dependent claims contain further developments of the method for dry-forming a cellulose bottle, the cellulose bottle forming unit, and the dry-formed cellulose bottle.

The disclosure concerns a method for dry-forming a cellulose bottle from an air-formed cellulose blank structure in a bottle forming unit. The dry-formed cellulose bottle comprises a neck portion, a closed bottom portion, and a mid-portion arranged between the closed bottom portion and the neck portion. The mid-portion is arranged in fluid communication with the neck portion. The method comprises the steps: shaping the dry-formed cellulose blank structure into a shaped cellulose blank structure, where the shaped cellulose blank structure has a tube-like configuration with an inner surface and an outer surface; feeding a first section of the shaped cellulose blank structure to a first forming mould and forming a semi-closed bottom portion of the cellulose bottle from the first section in the first forming mould, simultaneously with forming the neck portion of a directly preceding cellulose bottle from the first section in the first forming mould; feeding a following second section of the shaped cellulose blank structure to the first forming mould and forming the neck portion of the cellulose bottle from the second section in the first forming mould, simultaneously with forming a semi-closed bottom portion of a directly following cellulose bottle from the second section in the first forming mould.

Advantages with these features are that the method is enabling an efficient production process, where cellulose bottles with high quality can be produced at high speeds. The handling of the air-formed cellulose blank structure is simplified through use of the shaped cellulose blank structure having the tube-like configuration, and the first forming mould is used for efficiently producing bottles with high finish at increased production rates. In this way, a more efficient bottle forming method for producing high-quality cellulose bottles is achieved. The simultaneous forming of the semi-closed bottom portion of the cellulose bottle and the neck portion of a directly preceding cellulose bottle is providing a unique and fast forming operation.

In one embodiment, the first forming mould comprises openable and closable first mould parts arranged around a pressure lance. A first forming cavity is formed between the first mould parts and the pressure lance. The forming of the semi-closed bottom portion of the cellulose bottle in the first forming mould further comprises the steps: opening the first mould parts; feeding the shaped cellulose blank structure around the pressure lance and through the first mould parts; stopping the feeding of the shaped cellulose blank structure when the first section of the shaped cellulose blank structure is arranged in a position aligned with the first mould parts; closing the first mould parts and pressing the first section against the pressure lance by means of the first mould parts for forming the semi-closed bottom portion of the cellulose bottle in the first forming cavity, and simultaneously forming the neck portion of the directly preceding cellulose bottle in the first forming cavity. In this way, a section of the pressure lance is extending through the first forming cavity and forming part of the first forming mould. The section of the pressure lance extending through the first forming cavity is together with the first mould parts used for an efficient forming of the neck portion and the semi-closed bottom portion in the first forming cavity. During the pressing operation, a first forming pressure and a first forming temperature are suitably applied onto the shaped cellulose blank structure in the first forming cavity, for an efficient forming operation in the first forming mould.

In one embodiment, the forming of the neck portion of the cellulose bottle in the first forming mould further comprises the steps: opening the first mould parts; feeding the shaped cellulose blank structure around the pressure lance and through the first mould parts; stopping the feeding of the shaped cellulose blank structure when the second section of the shaped cellulose blank structure is arranged in a position aligned with the first mould parts; closing the first mould parts and pressing the second section against the pressure lance by means of the first mould parts for forming the neck portion of the cellulose bottle in the first forming cavity, and simultaneously forming the semi-closed bottom portion of the directly following cellulose bottle in the first forming cavity. The simultaneous forming of the semi-closed bottom portion of the cellulose bottle and the neck portion of a directly preceding cellulose bottle is providing a unique and fast forming operation, and in this way, the semi-closed bottom portion of the cellulose bottle is efficiently formed.

In one embodiment, the forming of the neck portion of the cellulose bottle in the first forming mould further comprises the steps: applying the first forming pressure and the first forming temperature onto a part of the second section of the shaped cellulose blank structure for forming a structurally rigid neck portion. In this way, the neck portion of the cellulose bottle is efficiently formed with a rigid structure for high structural strength and durability through the application of the first forming pressure and the first forming temperature onto the part of the second section used for forming the neck portion.

In one embodiment, the method further comprises the steps: feeding the formed semi-closed bottom portion of the cellulose bottle and an intermediate section of the shaped cellulose blank structure between the formed semi-closed bottom portion of the cellulose bottle and the formed neck portion of the cellulose bottle to a second forming mould; forming the mid-portion of the cellulose bottle from the intermediate section and forming the closed bottom portion of the cellulose bottle from the semi-closed bottom portion in the second forming mould. The second forming mould is in this way used for an efficient forming of the mid-portion of the cellulose bottle from the intermediate section and forming the closed bottom portion of the cellulose bottle from the semi-closed bottom portion after the forming operations in the first forming mould.

In one embodiment, the second forming mould comprises openable and closable second mould parts forming a second forming cavity. A flexible membrane connected to and arranged in fluid communication with the pressure lance is arranged in the second forming cavity. The forming of the mid-portion and the closed bottom portion in the second forming mould further comprises the steps: opening the first mould parts and opening the second mould parts; feeding the semi-closed bottom portion and the intermediate section around the pressure lance into the second forming mould; stopping the feeding of the semi-closed bottom portion and the intermediate section when positioned between the open second mould parts; closing the second mould parts around the semi-closed bottom portion and the intermediate section and inflating the flexible membrane with a pressure medium entering from the pressure lance and applying a second forming pressure onto the semi-closed bottom portion and the intermediate section by pressing the semi-closed bottom portion and the intermediate section against the second mould parts by means of the inflated flexible membrane, and applying a second forming temperature onto the semi-closed bottom portion and the intermediate section, for forming the closed bottom portion and the mid-portion; deflating the flexible membrane and opening the second mould parts; removing the formed cellulose bottle from the second forming mould. In this way, the flexible membrane when inflated by the pressure medium is applying the second forming pressure onto the intermediate section and the semi-closed bottom portion. Further, the applied second forming pressure together with the applied second forming temperature onto the semi-closed bottom portion and the intermediate section are efficiently forming the closed bottom portion and the mid-portion of the cellulose bottle.

In one embodiment, upon forming of the semi-closed bottom portion in the first forming mould, a collar section of the semi-closed bottom portion is established by forces acting on the shaped cellulose blank structure. The method further comprises the step: pushing the semi-closed bottom portion towards a closed configuration upon closing the second mould parts of the second forming mould around the semi-closed bottom portion, wherein the collar opening of the semi-closed bottom portion is closed by the forces exerted by the second mould parts. The closed configuration of the semi-closed bottom portion is enabling an efficient forming of the cellulose bottle, where the semi-closed bottom portion can be formed into the fully closed bottom portion in the second forming mould upon application of the second forming pressure and second forming temperature.

In one embodiment, the method further comprises the step: closing the first mould parts simultaneously with closing the second mould parts. The simultaneous closing is securing synchronized movements of the mould parts for an increased production speed.

In one embodiment, the bottle forming unit further comprises a cutting device arranged in the second mould part or in connection to the second mould part. The method further comprises the step: cutting off the formed neck portion of the cellulose bottle from the semi-closed bottom portion of the directly following cellulose bottle by means of the cutting device during the forming of the cellulose bottle in the second forming mould. The cutting device may be arranged with cutting edges on the outer second mould part and the inner second mould part respectively for an efficient cutting operation, where the cutting edges are cutting off the formed neck portion of the cellulose bottle from the semi-closed bottom portion of the directly following cellulose bottle upon closing of the second forming mould. According to one example embodiment, where the pressure lance extends into the second forming mould, the cutting device may be arranged to work against and around the pressure lance such that the pressure lance acts as an anvil against which the cutting edges are pressed for separating the neck portion from the semi-closed bottom portion. Here, the pressure lance may comprise a reinforced portion that can withstand the pressure from the cutting edges. The reinforced portion can be arranged as a thicker material portion of the pressure lance and/or can be made from a different material than adjacent pressure lance portions. As an alternative, the entire pressure lance is made from a suitable material than can withstand pressure both in the first forming mould and the second forming mould.

In one embodiment, the first forming mould comprises a thread forming section. The method further comprises the step: forming a threaded section of the neck portion upon forming of the neck portion in the first forming mould by means of the thread forming section. The thread forming section comprises a threaded pattern enabling efficient forming of the threaded section of the neck portion in the first forming mould.

In one embodiment, the directly preceding cellulose bottle is a leading cellulose bottle to the dry-formed cellulose bottle, and the directly following cellulose bottle is a trailing cellulose bottle to the dry-formed cellulose bottle.

The disclosure further concerns a bottle forming unit for dry-forming a cellulose bottle from an air-formed cellulose blank structure. The dry-formed cellulose bottle comprises a neck portion, a closed bottom portion, and a mid-portion arranged between the closed bottom portion and the neck portion. The mid-portion is arranged in fluid communication with the neck portion. The bottle forming unit comprises a feeding unit, a shaping unit and a first forming mould. The shaping unit is configured for shaping the dry-formed cellulose blank structure into a shaped cellulose blank structure having a tube-like configuration with an inner surface and an outer surface. The feeding unit is configured for feeding the shaped cellulose blank structure to the first forming mould. The first forming mould is configured for forming a neck portion of a leading cellulose bottle simultaneously with forming a semi-closed bottom portion of a directly following trailing cellulose bottle from the shaped cellulose blank structure.

Advantages with these features are that the bottle forming unit is enabling an efficient cellulose bottle production process, where cellulose bottles with high quality can be produced at high speeds. The handling of the air-formed cellulose blank structure is simplified through use of the shaped cellulose blank structure having the tube-like configuration, and the first forming mould is used for efficiently producing bottles with high finish at increased production rates. In this way, a more efficient bottle forming unit for producing high-quality cellulose bottles is achieved. The simultaneous forming of the semi-closed bottom portion of the cellulose and the neck portion of a directly preceding cellulose bottle from is providing a unique and fast forming operation.

In one embodiment, the first forming mould comprises openable and closable first mould parts arranged around a pressure lance. A first forming cavity is formed between the first mould parts and the pressure lance, and the feeding unit is configured for feeding the shaped cellulose blank structure around the pressure lance and through the first mould parts when the first mould parts are open. The first mould parts are when closed configured for pressing the shaped cellulose blank structure against the pressure lance for simultaneously forming the neck portion and the semi-closed bottom portion in the first forming cavity. In this way, a section of the pressure lance extending through the first forming cavity is forming part of the first forming mould, and the section of the pressure lance is used for an efficient forming of the neck portion and the semi-closed bottom portion in the first forming cavity. During the pressing operation, a first forming pressure and a first forming temperature are applied onto a part of the shaped cellulose blank structure used for forming the neck portion in the first forming cavity, for an efficient forming operation in the first forming mould.

In one embodiment, the bottle forming unit further comprises a second forming mould. The feeding unit is configured for feeding a formed semi-closed bottom portion and an intermediate section of the shaped cellulose blank structure between the formed semi-closed bottom portion and a directly following formed trailing neck portion to the second forming mould. The second forming mould is configured for forming the mid-portion from the intermediate section and forming the closed bottom portion from the semi-closed bottom portion. The second forming mould is in this way used for an efficient forming of the mid-portion of the cellulose bottle from the intermediate section and forming the closed bottom portion of the cellulose bottle from the semi-closed bottom portion after the forming operations in the first forming mould In one embodiment, the second forming mould comprises openable and closable second mould parts forming a second forming cavity. A flexible membrane connected to and arranged in fluid communication with the pressure lance is arranged in the second forming cavity. The feeding unit is configured for feeding the semi-closed bottom portion and the intermediate section around the pressure lance into the second forming mould when the first mould parts and the second mould parts are open. The second mould parts together with the flexible membrane, when the second mould parts are closed around the semi-closed bottom portion and the intermediate section, are configured for forming the closed bottom portion and the mid-portion by inflating the flexible membrane with a pressure medium entering from the pressure lance, where the semi-closed bottom portion and the intermediate section are pressed against the second mould parts by means of the inflated flexible membrane. In this way, the flexible membrane when inflated by the pressure medium is applying a second forming pressure onto the intermediate section and the semi-closed bottom portion. Further, the applied second forming pressure together with an applied second forming temperature onto the semi-closed bottom portion and the intermediate section are efficiently forming the closed bottom portion and the mid-portion of the cellulose bottle.

In one embodiment, the pressure lance is extending to or partly into the second forming cavity. The pressure lance is with these configurations efficiently providing the pressure medium to the flexible membrane arranged within the second forming cavity for inflating or deflating the flexible membrane in the forming operation process.

In one embodiment, the bottle forming unit comprises a fluid control device. The pressure lance is at a first end arranged in fluid communication with the fluid control device, and the pressure lance is at a second end arranged in fluid communication with the flexible membrane. The fluid control device is configured for inflating the flexible membrane with the pressure medium via the pressure lance upon forming the cellulose bottles in the second forming mould. The fluid control device is further arranged for deflating the flexible membrane via the pressure lance after the forming operation in the second forming mould. The fluid control device may have any suitable configuration, and may comprise hydraulic or pneumatic cylinders, fluid pumps, compressors, or other pressure establishing devices for delivering pressurized pressure medium to the flexible membrane via the pressure lance.

In one embodiment, the bottle forming unit further comprises a cutting device arranged in the second mould part or in connection to the second mould part. The cutting device is configured for cutting off the formed neck portion of a leading cellulose bottle from the semi-closed bottom portion of a directly following trailing cellulose bottle by means of the cutting device during the forming of the cellulose bottle in the second forming mould. The cutting device may be arranged with cutting edges on the outer second mould part and the inner second mould part respectively for an efficient cutting operation, where the cutting edges are cutting off the formed neck portion of the leading cellulose bottle from the semi-closed bottom portion of the directly following trailing cellulose bottle upon closing of the second forming mould.

In one embodiment, the first forming mould comprises a thread forming section configured for forming a threaded section of the neck portion upon forming of the neck portion in the first forming mould. The thread forming section comprises a threaded pattern for efficient forming of the threaded section of the neck portion in the first forming mould.

The disclosure further concerns a dry-formed cellulose bottle. The cellulose bottle has an extension in a longitudinal direction and comprises a neck portion, a closed bottom portion, and a mid-portion arranged in the longitudinal direction between the closed bottom portion and the neck portion. The mid-portion is arranged in fluid communication with the neck portion, and the cellulose bottle comprises a compressed seam section. The seam section is extending along the cellulose bottle through the neck portion, the mid-portion, and the closed bottom portion. The seam section is resulting from an overlapping tube-like configuration of the shaped cellulose blank structure when arranged in the forming moulds. The overlapping tube-like configuration is securing that the shaped cellulose blank structure is formed without any gaps or open passages in the feeding direction. The seam section is providing a rigid structural part of the cellulose bottle, and with the overlapping configuration resulting in the seam section the cellulose bottle can be formed without any residual parts of the cellulose blank structure after forming the cellulose bottle in the forming moulds.

In one embodiment, the seam section is extending in the longitudinal direction of the cellulose bottle, or extending essentially in the longitudinal direction of the cellulose bottle. The extension of the seam section is mainly determined by the overlapping tube-like configuration of the shaped cellulose blank structure, and the extension along the cellulose bottle is providing a rigid structural part along the length of the cellulose bottle.

In one embodiment, the seam section of the neck portion has a higher basis weight compared to at least adjacent parts of the neck portion outside the seam section, the seam section of the mid-portion has a higher basis weight compared to at least adjacent parts of the mid-portion outside the seam section, wherein the seam section of the closed bottom portion has a higher basis weight compared to at least adjacent parts of the closed bottom portion outside the seam section. The higher basis weight is resulting from the accumulation of material in the overlapping tube-like configuration of the shaped cellulose blank structure, and the higher basis weight is used for providing the rigid structural part of the cellulose bottle formed by the seam section.

In one embodiment, the neck portion comprises a smooth inner surface and an outer surface arranged with a threaded section. The smooth inner surface is securing a surface structure suitable for preventing bacterial growth and for adding barrier structures, such as plastic films or additives. The threaded section is enabling use of caps for closing the cellulose bottle.

In one embodiment, the cellulose bottle comprises a shaped air-formed cellulose blank structure.

In one embodiment, the closed bottom portion comprises a centrally arranged closed collar section of compressed cellulose fibres. The centrally closed collar section is resulting from the forming process and is providing a rigid bottom structure of the cellulose bottle.

In one embodiment, the closed collar section is positioned at a distance above one or more lowest parts of the closed bottom portion in the longitudinal direction. With this configuration, the one or more lowest parts of the cellulose bottle can be used for providing a stable bottom structure of the cellulose bottle, where the bottom structure suitably has an inwardly curved surface configuration. The cellulose bottle has with this construction a high stability when placed on an object surface, such as for example a table surface or other surface.

In one embodiment, the neck portion has a higher average basis weight compared to the mid-portion, and the closed bottom portion has a higher average basis weight compared to the mid-portion. This configuration is providing high rigidity in the neck portion and the closed bottom portion. The higher average basis weight results from a higher amount of fibres per unit area in a certain section of the cellulose bottle compared to another comparable section of the cellulose bottle. In the example embodiment where the cellulose blank structure has the same width and thickness when formed into the tube-like configuration and fed to the first and second forming moulds, and the neck portion has a smaller diameter than the mid-portion, then the same amount fibres are packed into a smaller unit area in the neck portion than in a comparable section of the mid-portion.

BRIEF DESCRIPTION OF DRAWINGS

The disclosure will be described in detail in the following, with reference to the attached drawings, in which.

DESCRIPTION OF EXAMPLE EMBODIMENTS

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 1:
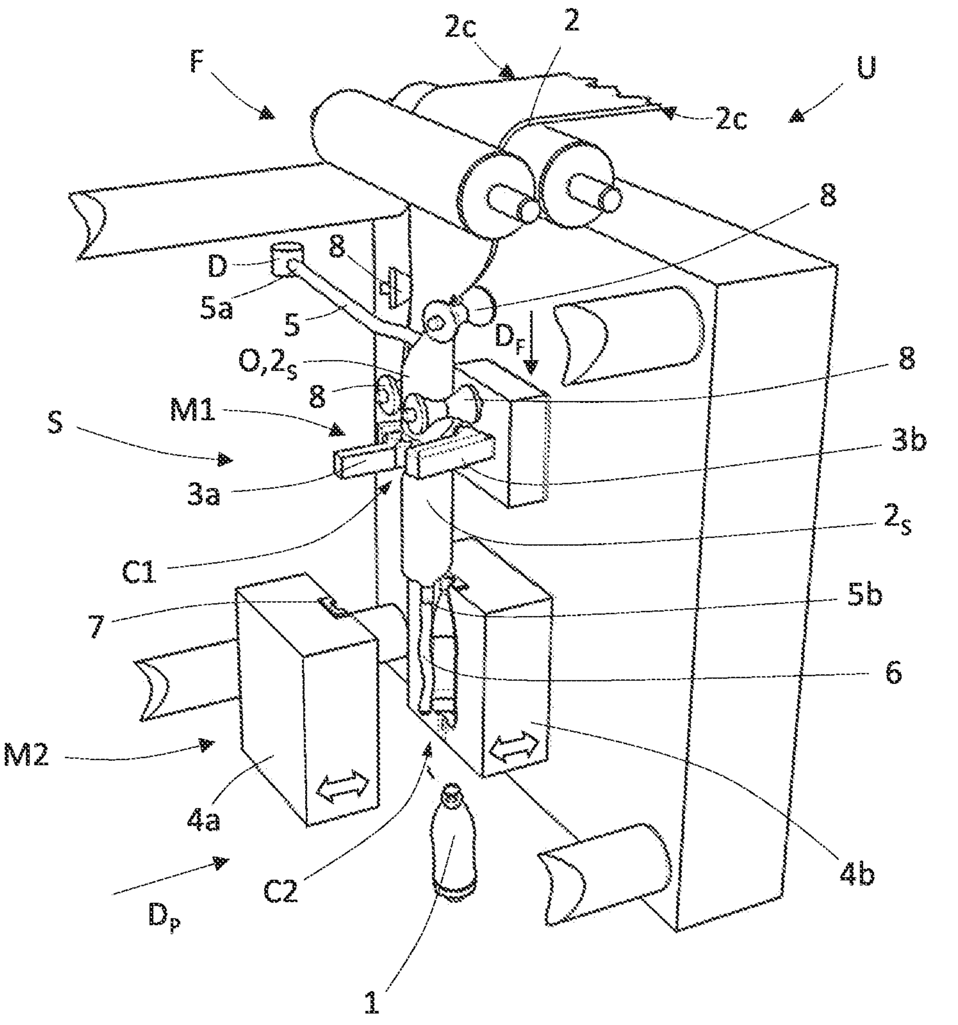
FIG. 1 shows schematically, in a perspective view, a bottle forming unit with a first forming mould and a second forming mould.

FIG. 1 schematically shows a bottle forming unit U for dry-forming a cellulose bottle 1 from an air-formed cellulose blank structure 2. The bottle forming unit U comprises a feeding unit F, a shaping unit S, a first forming mould M1, and a second forming mould M2. The bottle forming unit U is arranged for dry-forming the cellulose bottle 1 from the cellulose blank structure 2 in different operational steps in the first forming mould M1 and the second forming mould M2 for an efficient bottle forming process.

In the embodiment illustrated in FIG. 1, the first forming mould M1 is positioned above the second forming mould M2, and the first forming mould M1 is in this way arranged upstream the second forming mould M2. It should however be understood that the bottle forming unit U in other non-illustrated embodiments may be positioned in other ways, where the first forming mould M1 is arranged upstream the second forming mould M2.

With an air-formed cellulose blank structure 2 is meant an essentially air-formed fibrous web structure produced from cellulose fibres. The cellulose fibres may originate from a suitable cellulose raw material, such as a pulp material. Suitable pulp materials are for example fluff pulp, paper structures, or other cellulose fibre-containing structures. With air-forming of the cellulose blank structure 2 is meant the formation of a cellulose blank structure in a dry-forming process in which the cellulose fibres are air-formed to produce the cellulose blank structure 2. When air-forming the cellulose blank structure 2 in the air-forming process, the cellulose fibres are carried and formed to the fibre blank structure 2 by air as carrying medium. This is different from a normal papermaking process or a traditional wet-forming process, where water is used as carrying medium for the cellulose fibres when forming the paper or fibre structure. In the air-forming process, small amounts of water or other substances may if desired be added to the cellulose fibres in order to change the properties of the cellulose bottles, but air is still used as carrying medium in the forming process. The cellulose blank structure 2 may, if suitable have a dryness that is mainly corresponding to the ambient humidity in the atmosphere surrounding the air-formed cellulose blank structure 2. As an alternative, the dryness of the cellulose blank structure 2 can be controlled in order to have a suitable dryness level when forming the cellulose bottles 1.

The cellulose blank structure 2 may have a composition where the fibres are of the same origin or alternatively contain a mix of two or more types of cellulose fibres, depending on the desired properties of the cellulose bottles 1. The cellulose fibres used in the cellulose blank structure 2 are during the forming process of the cellulose bottles 1 strongly bonded to each other with hydrogen bonds. The cellulose fibres may be mixed with other substances or compounds to a certain amount as will be further described below. With cellulose fibres is meant any type of cellulose fibres, such as natural cellulose fibres or manufactured cellulose fibres. The cellulose blank structure 2 may specifically comprise at least 95% cellulose fibres, or more specifically at least 99% cellulose fibres. However, the cellulose blank structure 2 may have other suitable configurations and cellulose fibre amounts.

The air-formed cellulose blank structure 2 may have a single-layer or a multi-layer configuration. A cellulose blank structure 2 having a single-layer configuration is referring to a structure that is formed of one layer containing cellulose fibres. A cellulose blank structure 2 having a multi-layer configuration is referring to a structure that is formed of two or more layers comprising cellulose fibres, where the layers may have the same or different compositions or configurations.

One or more reinforcement layers comprising cellulose fibres may be added to the cellulose blank structure 2. The one or more reinforcement layers may be arranged as carrying layers for the cellulose blank structure 2. The reinforcement layer may have a higher tensile strength than the cellulose blank structure 2. This is useful when one or more air-formed layers of the cellulose blank structure 2 have compositions with low tensile strength in order to avoid that the cellulose blank structure 2 will break during the forming of the cellulose bottles 1. The reinforcement layer with a higher tensile strength acts in this way as a supporting structure for the cellulose blank structure 2. The reinforcement layer may be of a different composition than the cellulose blank structure 2, such as for example a tissue layer containing cellulose fibres, an airlaid structure comprising cellulose fibres, or other suitable layer structures. It is thus not necessary that the reinforcement layer is air-formed. The one or more reinforcement layers may be provided with graphical elements or patterns for enabling aesthetically attractive cellulose bottles 1.

The cellulose blank structure 2 may further comprise or be arranged in connection to one or more barrier layers giving the cellulose bottles 1 the ability to hold or withstand liquids, such as for example when the cellulose bottles 1 are used in contact with beverages, food, and other water-containing substances. The one or more barrier layers may be of a different composition than the rest of the cellulose blank structure 2, such as for example a tissue barrier structure or a plastic film structure. The cellulose blank structure 2 may further comprise additives for achieving desired properties of the cellulose bottles 1. The one or more barrier layers may also be applied to the outside of the cellulose bottles 1, and the one or more barrier layers may be provided with graphical elements or patterns for enabling aesthetically attractive cellulose bottles 1.

The one or more air-formed layers of the cellulose blank structure 2 are fluffy and airy structures, where the cellulose fibres forming the structures are arranged relatively loosely in relation to each other. The fluffy cellulose blank structures 2 are used for an efficient forming of the cellulose bottles 1, allowing the cellulose fibres to form the cellulose bottles 1 in an efficient way during the forming process.

The shaping unit S is configured for shaping the dry-formed cellulose blank structure 2. This shaping of the cellulose blank structure 2 in the shaping unit S is enabling efficient transportation of the cellulose blank structure 2 and forming of the cellulose bottles 1 in the first forming mould M1 and the second forming mould M2. In the shaping unit S, the cellulose blank structure 2 is shaped into a shaped cellulose blank structure $2_S$ having a tube-like configuration with an inner surface 2*a* and an outer surface 2*b*. The cellulose blank structure 2 is provided to the bottle forming unit U in a flat shape, or essentially flat shape as understood from FIG. 1.

The cellulose blank structure 2 is transported to the feeding unit F for further transportation of the cellulose blank structure 2 to the shaping unit S and the forming moulds, and in the illustrated embodiment, the feeding unit F comprises a pair of feeding rollers. The feeding unit F is configured for feeding the shaped cellulose blank structure $2_S$ to the first forming mould M1 and the second forming mould M2. The feeding unit is further arranged to stop the feeding of the shaped cellulose blank structure $2_S$ upon forming in the respective forming moulds. It should however be understood that the feeding unit F may have any suitable configuration, such as conveyor belts or other transporting means. The feeding unit F may further be arranged with non-illustrated feeding rollers, feeding belts, or other transportation means arranged in connection to the first forming mould M1 and/or the second forming mould M2, for an efficient feeding, pulling and/or pushing of the shaped cellulose blank structure $2_S$ through the bottle forming unit U. The feeding rollers, feeding belts, or other transportation means, may be arranged before and/or after the first forming mould M1 and/or the second forming mould M2, and provided with suitable gripping means for feeding, pulling and/or pushing the shaped cellulose blank structure $\mathbf{2}_S$. The construction and layout of the feeding unit F may for example vary depending on the design of the bottle forming unit U, the size and design of the cellulose bottles 1 produced, and materials used in the cellulose blank structure 2.

In the illustrated embodiment, the shaping unit S comprises a plurality of deflecting rollers 8 for shaping the dry-formed cellulose blank structure 2 into the shaped cellulose blank structure $\mathbf{2}_S$. The deflecting rollers 8 are shaping the cellulose blank structure 2 upon feeding in a feeding direction $D_F$ through a deflecting movement of the cellulose blank structure 2 enabled by the deflecting rollers 8. When passing through the shaping unit S in the feeding direction $D_F$, the cellulose blank structure 2 is shaped into the shaped cellulose blank structure $\mathbf{2}_S$ with the tube-like configuration by the deflecting rollers 8, as understood from FIG. 1. The formed shaped cellulose blank structure $\mathbf{2}_S$ is suitably having an overlapping tube-like configuration O that is securing that the shaped cellulose blank structure $\mathbf{2}_S$ is formed without any gaps or open passages in the feeding direction $D_F$. When being shaped, opposite side edges 2c of the cellulose blank structure 2 are overlapping each other in the shaped cellulose blank structure $\mathbf{2}_S$. The shaping unit S may in other non-illustrated embodiments be arranged with deflecting plates or similar arrangements instead of the deflecting rollers 8, or alternatively arranged with a combination of deflecting plates and deflecting rollers.

Figure 2B:
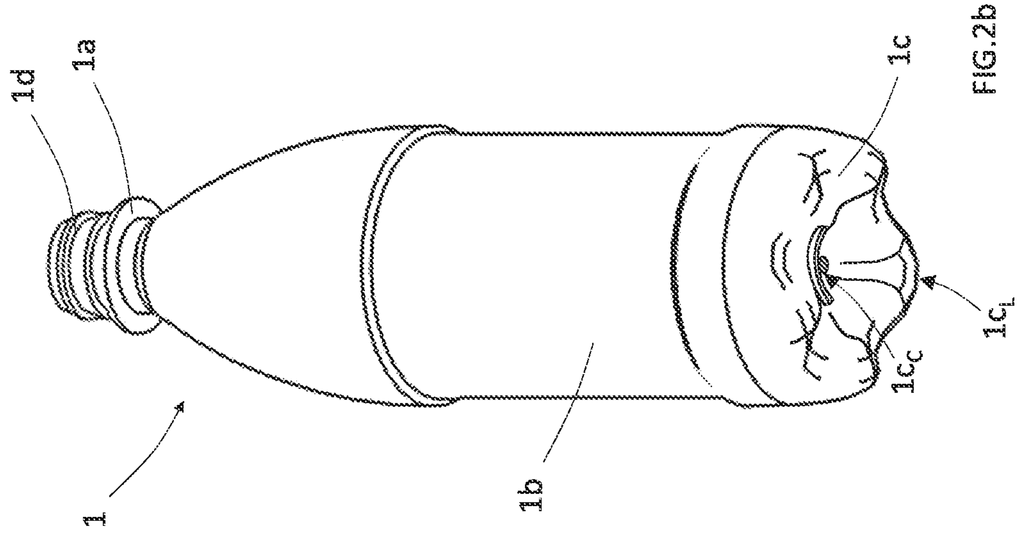
FIG. 2*a-f* show schematically, in a perspective view from above and a perspective view from below, a cellulose bottle formed in the bottle forming unit; and in side views and in a perspective view, a shaped cellulose blank structure in different forming steps.
Figure 2A:
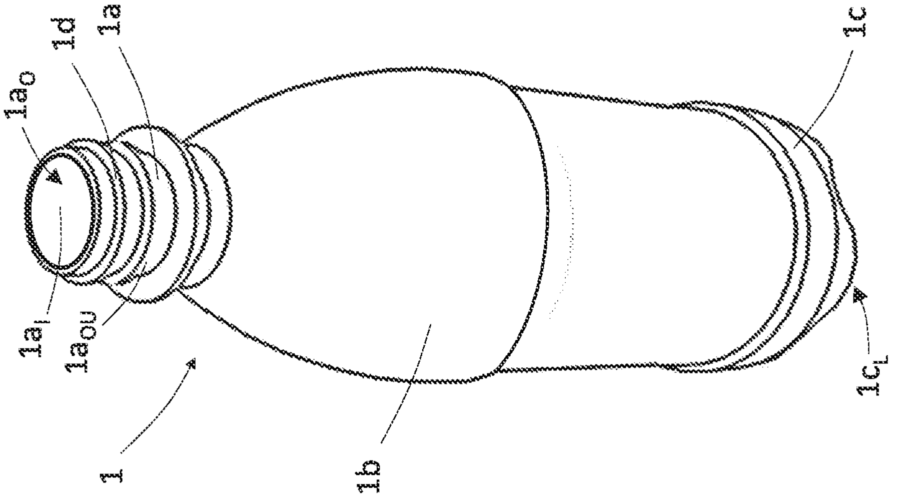
Figure 7:
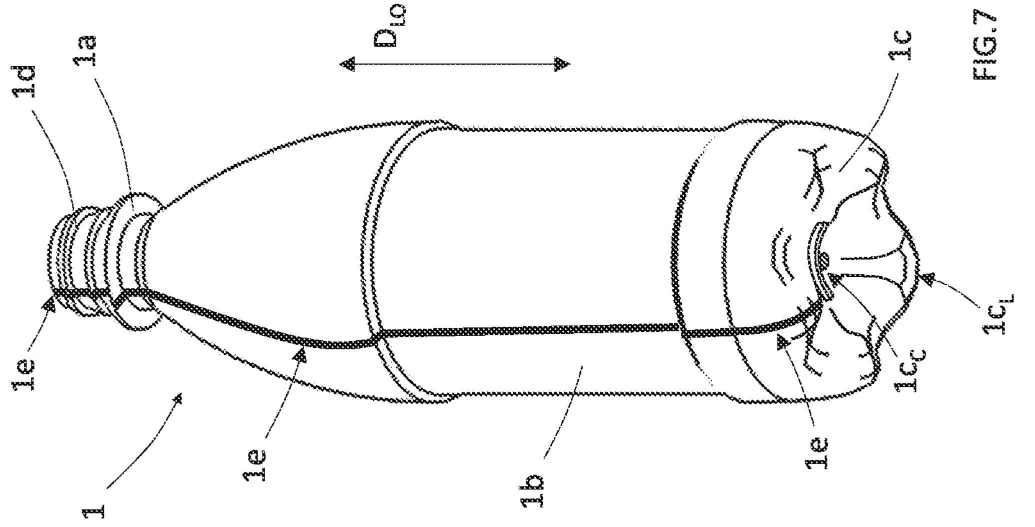
FIG. 7 shows schematically, in a perspective view from below, a cellulose bottle comprising a seam section formed in the bottle forming unit.

A dry-formed cellulose bottle 1 is schematically shown in FIGS. 2a-b and 7. The cellulose bottle 1 has an extension in a longitudinal direction $D_{LO}$ and comprises a neck portion 1a, a closed bottom portion 1c, and a mid-portion 1b arranged in the longitudinal direction between the closed bottom portion 1c and the neck portion 1a. When the cellulose bottle 1 is arranged in the position shown in FIGS. 2a-b and 7, the mid-portion 1b is arranged above the closed bottom portion 1c and the neck portion 1a is arranged above the mid-portion 1b. In the following, when it is referred to relative positions of the cellulose bottle 1 when formed or upon forming, expressions such as above are referring to the positioning of the cellulose bottle 1 illustrated in FIGS. 2a-b and 7, where the cellulose bottle 1 is arranged for being placed on a surface in a standing position. The mid-portion 1b is arranged in fluid communication with the neck portion 1a, and the neck portion 1a is provided with a flow opening $\mathbf{1}a_O$. The neck portion 1a suitably comprises a threaded section 1d for a secure attachment of a non-illustrated threaded cap.

The dry-formed cellulose bottle 1 is arranged as a rigid self-sustained cellulose-based bottle structure comprising compressed air-formed cellulose fibres. The neck portion 1a is in a conventional manner arranged with a through channel for transportation of liquids out from the cellulose bottle 1 via the flow opening $\mathbf{1}a_O$. The closed bottom portion 1c and the mid-portion 1b are together forming a liquid holding space, and the mid-portion 1b has a hollow configuration.

The cellulose bottle 1 further comprises a compressed seam section 1e, as shown in FIG. 7. The seam section 1e is in the illustrated embodiment extending along the cellulose bottle 1 through the neck portion 1a, the mid-portion 1b and the closed bottom portion. The seam section is resulting from the overlapping tube-like configuration O of the shaped cellulose blank structure $\mathbf{2}_S$ when arranged in the forming moulds. The overlapping tube-like configuration O of the shaped cellulose blank structure $\mathbf{2}_S$ is securing that the cellulose bottle 1 is formed without any gaps or open passages. The seam section 1e is providing a rigid structural part of the cellulose bottle 1, and with the overlapping configuration resulting in the seam section 1e the cellulose bottle 1 can be formed without any residual parts of the cellulose blank structure 2 after forming of the cellulose bottle 1 in the first forming mould M1 and the second forming mould M2.

The seam section 1e is in the illustrated embodiment extending in the longitudinal direction of the cellulose bottle, or essentially in the longitudinal direction of the cellulose bottle, as shown in FIG. 7. The extension of the seam section is mainly determined by the overlapping tube-like configuration O of the shaped cellulose blank structure $\mathbf{2}_S$, and the extension of the seam section 1e along the cellulose bottle 1 is providing a rigid structural part along the length of the cellulose bottle 1. The seam section 1e of the neck portion 1a has a higher basis weight compared to at least adjacent parts of the neck portion 1a outside the seam section 1e. The seam section 1e of the mid-portion 1b has a higher basis weight compared to at least adjacent parts of the mid-portion 1b outside the seam section 1e. The seam section 1e of the closed bottom portion 1c has a higher basis weight compared to at least adjacent parts of the closed bottom portion 1c outside the seam section 1e. The higher basis weight is resulting from the accumulation of material in the overlapping tube-like configuration O of the shaped cellulose blank structure 2S when forming the cellulose bottle 1. The higher basis weight is used for providing the rigid structural part of the cellulose bottle formed by the seam section 1e.

The neck portion 1a comprises a smooth inner surface $\mathbf{1}a_I$ and an outer surface $\mathbf{1}a_{OU}$ arranged with the threaded section. The smooth inner surface $\mathbf{1}a_I$ is securing a surface structure suitable for preventing bacterial growth and for adding barrier structures, such as plastic films or additives. The threaded section 1d is enabling use of caps for closing the cellulose bottle 1.

As will be further described below, the closed bottom portion 1c comprises a centrally arranged closed collar section $\mathbf{1}c_C$ of compressed cellulose fibres. The centrally closed collar section $\mathbf{1}c_C$ is resulting from the bottle forming process in the first forming mould m1 and the second forming mould M2 and is providing a rigid bottom structure of the cellulose bottle 1.

The closed collar section $\mathbf{1}c_C$ is positioned at a distance above one or more lowest parts $\mathbf{1}c_L$ of the closed bottom portion 1c in the longitudinal direction, as understood from for example FIG. 7. With this configuration, the one or more lowest parts $\mathbf{1}c_L$ of the cellulose bottle 1 can be used for providing a stable bottom structure of the cellulose bottle 1, where the bottom structure suitably has an inwardly curved surface configuration. The cellulose bottle 1 has with this construction a high stability when placed on an object surface, such as for example a table surface or other surface. In the embodiment illustrated in FIG. 7, the cellulose bottle 1 is arranged with several lowest parts $\mathbf{1}c_L$ for a high stability.

The neck portion 1a has a higher average basis weight compared to the mid-portion 1b, and the closed bottom portion 1c has a higher average basis weight compared to the mid-portion 1b. This configuration is providing high rigidity in the neck portion and the closed bottom portion, and is resulting from the bottle forming process where different parts of the shaped cellulose blank structure $\mathbf{2}_S$ are radially compressed to different degrees, as will be understood from the details of the bottle forming process described below.

The cellulose bottle 1 is formed in different forming steps in the first forming mould M1 and the second forming mould M2. The first forming mould M1 is used for forming the neck portion 1*a* of the cellulose bottle 1, and partly forming the closed bottom portion 1*c* of the cellulose bottle 1 into a semi-closed bottom portion $\mathbf{1}c_S$. The second forming mould M2 is used for forming the mid-portion 1*b* of the cellulose bottle 1 and forming the closed bottom portion 1*c* from the semi-closed bottom portion $\mathbf{1}c_S$. Upon forming of the semi-closed bottom portion $\mathbf{1}c_S$ in the first forming mould, a collar section $\mathbf{1}c_C$ of the semi-closed bottom portion $\mathbf{1}c_S$ is established by forces acting on the shaped cellulose blank structure $\mathbf{2}_S$.

Each individual cellulose bottle 1 is formed in main sequential forming steps in the first forming mould M1 and the second forming mould M2. The semi-closed bottom portion $\mathbf{1}c_S$ is formed in a first sequential forming step in the first forming mould M1, the neck portion 1*a* is formed in a second sequential forming step in the first forming mould M1, and the mid-portion 1*b* together with the closed bottom portion 1*c* is formed in a third sequential forming step in the second forming mould M2, as will be further described below.

The first forming mould M1 has a dual configuration for simultaneous forming of a neck portion 1*a* and a semi-closed bottom portion $\mathbf{1}c_S$, and as understood from the illustrated configuration of the bottle forming unit U, the simultaneous forming in the first forming mould M1 is resulting in the forming of a neck portion 1*a* and a semi-closed bottom portion $\mathbf{1}c_S$ of different bottles. In this way, the first forming mould M1 is configured for forming a neck portion 1*a* of a leading cellulose bottle 1L simultaneously with forming a semi-closed bottom portion $\mathbf{1}c_S$ of a directly following trailing cellulose bottle 1T from the shaped cellulose blank structure $\mathbf{2}_S$, as will be further described below.

Figure 3A:
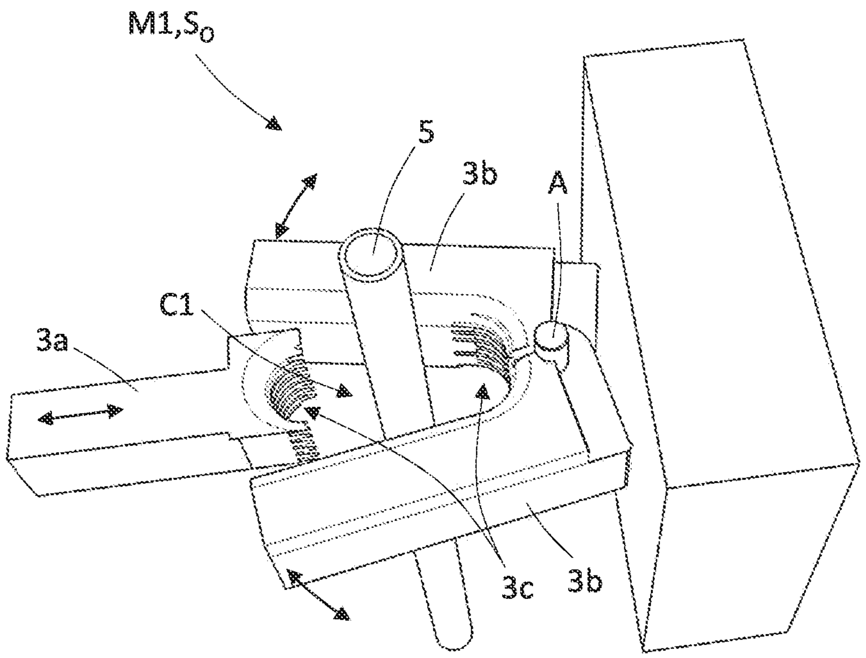
FIG. 3*a-e* show schematically, in perspective views from above, the first forming mould in different operational steps.
Figure 3B:
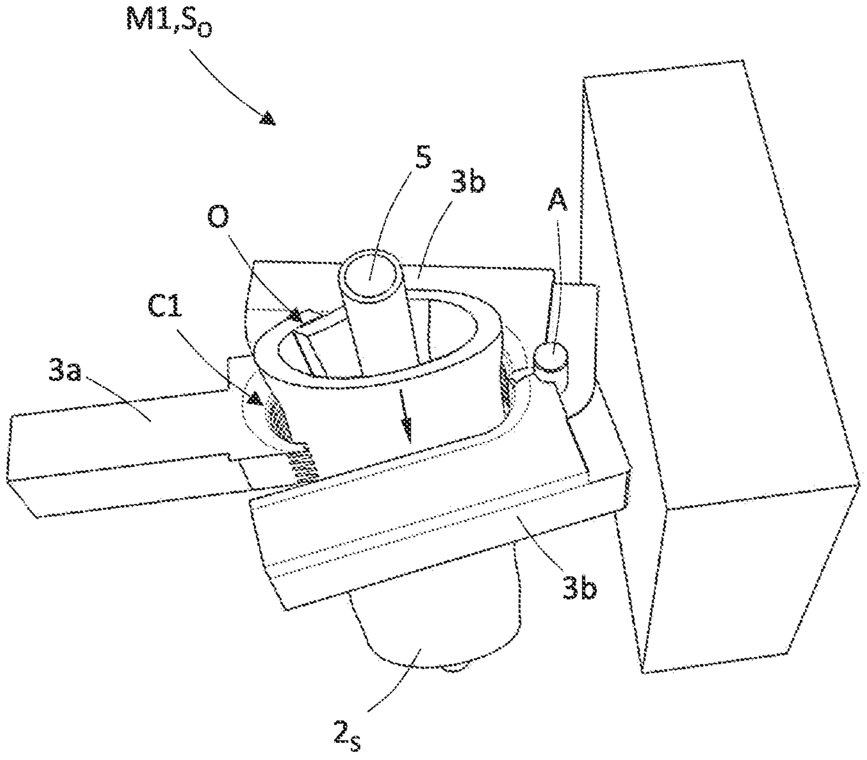

The first forming mould M1 is schematically illustrated in FIGS. 3*a-e*. In FIGS. 3*a-e*, the shaped cellulose blank structure $\mathbf{2}_S$ is sectioned for illustrative purposes, where only a part of the shaped cellulose blank structure $\mathbf{2}_S$ is shown. The first forming mould M1 comprises openable and closable first mould parts 3*a*,3*b* arranged around a pressure lance 5. An outer first mould part 3*a* is movably arranged relative to the pressure lance 5 as indicated with the arrow in FIG. 3*a*. The outer first mould part 3*a* is suitably displaceable in reciprocating linear movements towards and away from the pressure lance 5. An inner first mould part 3*b* comprises clamping arm sections pivotably arranged relative to each other around a pivoting axis A, as indicated with arrows in FIG. 3*a*. The inner first mould part 3*b* is extending partly around the pressure lance 5. The inner first mould part 3*a* is suitably displaceable in pivoting movements around the pivoting axis A towards and away from the pressure lance 5. In FIG. 3*a*, the first forming mould M1 is arranged in an open state $S_O$, where the first mould parts 3*a*,3*b* have been displaced away from the pressure lance, allowing the shaped cellulose blank structure $\mathbf{2}_S$ to be fed around the pressure lance 5 and through the first mould parts 3*a*,3*b*, as shown in FIG. 3*b*.

Figure 3C:
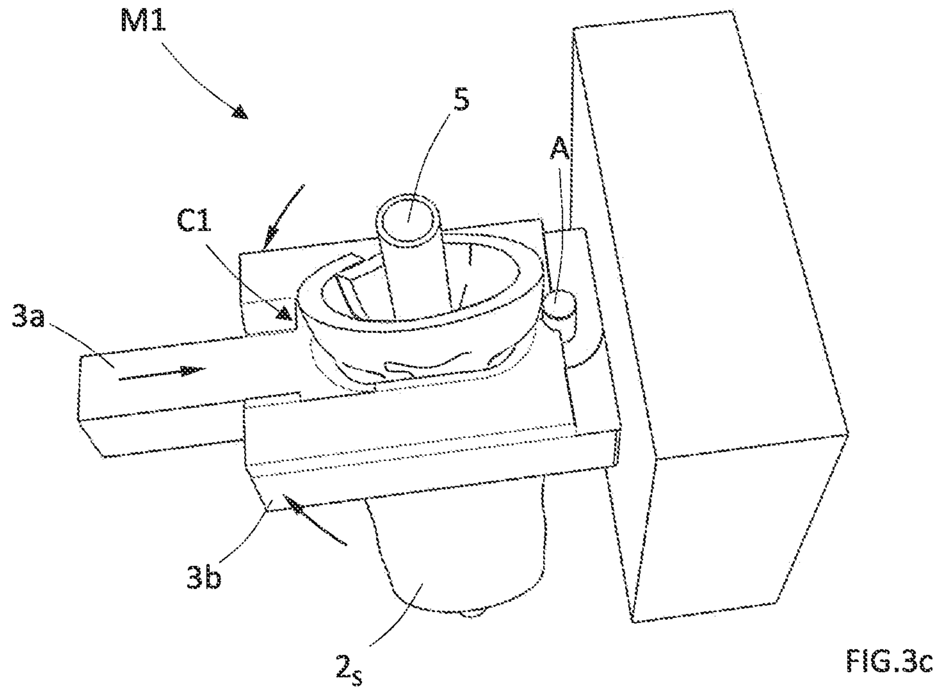
Figure 3D:
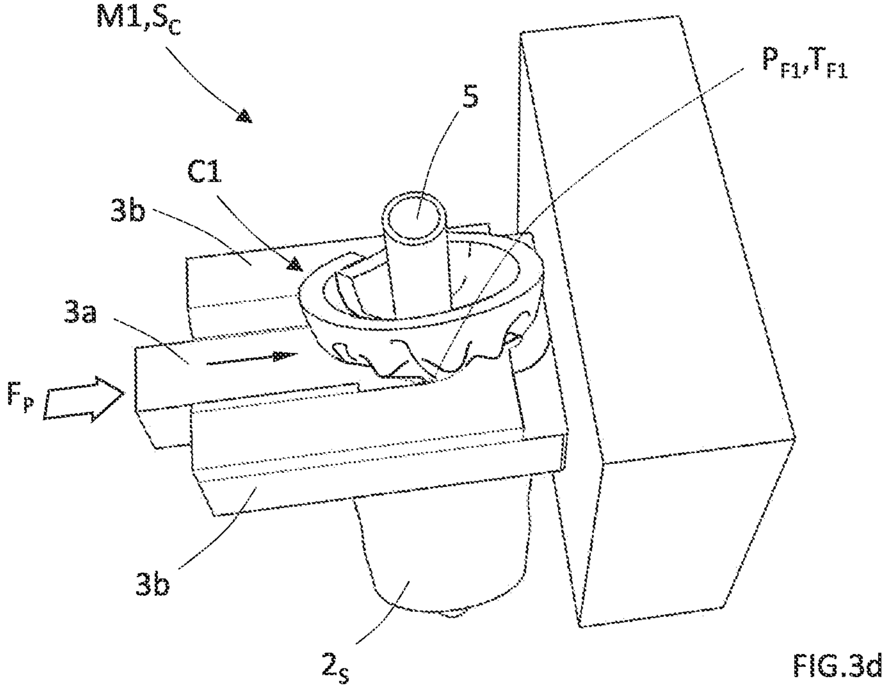
Figure 3E:
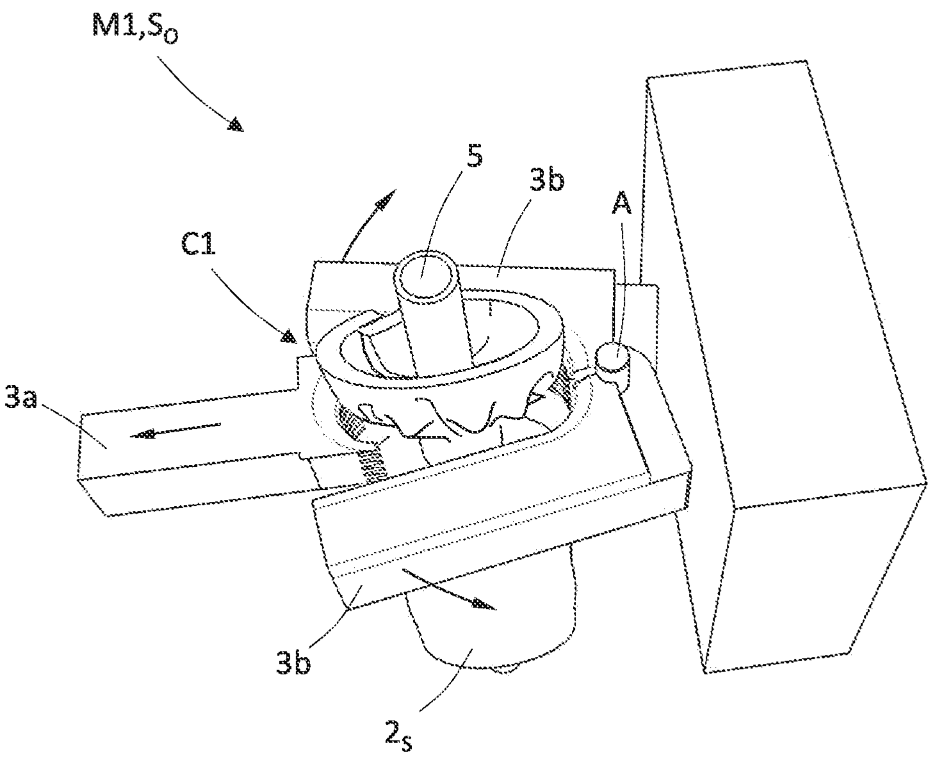

The first forming mould M1 comprises a first forming cavity C1 formed between the first mould parts 3*a*,3*b* and the pressure lance 5, as shown in FIGS. 3*a-e*. The feeding unit F is feeding the shaped cellulose blank structure $\mathbf{2}_S$ around the pressure lance 5 and through the first mould parts 3*a*,3*b* when the first mould parts 3*a*,3*b* are arranged in the open state $S_O$. When the shaped cellulose blank structure $\mathbf{2}_S$ is arranged in the position shown in FIG. 3*b*, where the shaped cellulose blank structure $\mathbf{2}_S$ is positioned between the pressure lance 5 and the first mould parts 3*a*,3*b*, the first mould parts may be displaced towards the pressure lance 5, as indicated with arrows in FIG. 3*c*. Suitably, the inner first mould part 3*b* is pivoted towards the pressure lance 5 in a movement faster than the displacement of the outer first mould part 3*b* for an efficient forming process. When the inner first mould part 3*b* is closed, as shown in FIG. 3*c*, the outer first mould part 3*a* may be further pushed towards the pressure lance 5 with a suitable pushing force $F_P$ to a closed state $S_C$ of the first forming mould M1, as indicated with the arrow in FIG. 3*d*. When closed, the first mould parts 3*a*,3*b* are pressing the shaped cellulose blank structure $\mathbf{2}_S$ radially against the pressure lance 5 for simultaneously forming the neck portion 1*a* and the semi-closed bottom portion $\mathbf{1}c_S$ in the first forming cavity C1. During the pressing operation, a first forming pressure $P_{F1}$ and a first forming temperature $T_{F1}$ are at least applied onto the part of the shaped cellulose blank structure $\mathbf{2}_S$ used for forming the neck portion 1*a* in the first forming cavity C1. After the forming operation the first forming mould M1 is returned to the open state $S_O$, as shown in FIG. 3*e*. In FIG. 3*e*, the formed neck portion 1*a* and the semi-closed bottom portion $\mathbf{1}c_S$ with the collar section $\mathbf{1}c_C$ is schematically shown, where the collar section $\mathbf{1}c_C$ is the most narrow portion of the semi-closed bottom portion $\mathbf{1}c_S$ that is transitioning towards the neck portion 1*a*. As understood from the figure, the collar section $\mathbf{1}c_C$ has a collar opening $\mathbf{1}c_O$ that is corresponding to the flow opening $\mathbf{1}a_O$ of the neck portion 1*a*.

The first forming mould M1 suitably comprises a thread forming section 3*c*, as shown in for example FIG. 3*a*. The thread forming section 3*c* is forming the threaded section 1*d* of the neck portion 1*a* upon forming of the neck portion 1*a* in the first forming mould M1. The thread forming section is arranged with a threaded pattern for efficient forming of threads of the threaded section on the outside surface of the neck portion 1*a* in the first forming mould, as understood from the figures.

The applied second forming pressure $P_{F2}$ is suitably in the range of 1-100 MPa, preferably 4-20 MPa, and the applied second forming temperature $T_{F2}$ is suitably in the range of 100-300° C., preferably 100-200° C.

The first mould parts 3*a*,3*b* of the first forming mould M1 are suitably arranged as stiff mould parts. With stiff mould parts is meant that the mould parts are made of a stiff material with limited deformation capabilities, such as for example steel, aluminium, composite materials or a combination of different materials. The section of the pressure lance 5 extending through the first forming mould M1 is suitably made of a stiff material with limited deformation capabilities, such as for example steel, aluminium, composite materials or a combination of different materials. This section of the pressure lance 6 may be stiffer than the other parts of the pressure lance 6 to withstand the high forming pressure in the first forming mould M1. In one embodiment, the section of the pressure lance 5 extending through the first forming mould M1 is reinforced with an outer structural piece of material surrounding the pressure lance 5, establishing a strong structural part around the pressure lance 5.

The first mould part M1 may further comprise a heating unit. The heating unit is configured for applying the first forming temperature $T_{F1}$ onto the shaped cellulose blank structure $\mathbf{2}_S$ in the first forming cavity C1 during the forming operation in the first forming mould M1. The heating unit may have any suitable configuration. The heating unit may be integrated in or cast into the first mould parts 3*a*,3*b*, and suitable heating devices are e.g. electrical heaters, such as resistor elements, or fluid heaters. Other suitable heat sources may also be used.

The shaped cellulose blank structure $2_S$ may in other non-illustrated embodiments be pre-shaped into an hour-glass-shape before being inserted into the first forming mould M1 for facilitating the forming operation in the first forming mould M1. Suitable shaping elements may be used for delimiting the radial extension of sections of the pre-shaped cellulose blank structure $2_S$ for enabling the hour-glass shape. The shaping elements may for example be arranged as a snare structure or snare-like element arranged around the shaped cellulose blank structure $2_S$ upstream the first forming mould M1, where the snare structure or snare-like element upon constriction is delimiting the radial extension of a section of the shaped cellulose blank structure $2_S$. After pre-shaping, the snare structure or snare-like element is returning to a non-constricted state for feeding of the pre-shaped section of the shaped cellulose blank structure $2_S$ to the first forming mould M1.

As described above, each individual cellulose bottle 1 is formed in sequential steps in the first forming mould M1 and the second forming mould M2. When the semi-closed bottom portion $1c_S$ and the neck portion 1*a* for an individual bottle 1 have been formed in the first sequential and second sequential forming steps in the first forming mould M1, the semi-closed bottom portion $1c_S$ and the neck portion 1*a* together with an intermediate section $S_{INT}$ of the shaped cellulose blank structure $2_S$ between the formed semi-closed bottom portion $1c_S$ and the neck portion 1*a* is transported to the second forming mould M2. The mid-portion 1*b* together with the closed bottom portion is formed in a third sequential forming step in the second forming mould M2, as will be further described below.

Figure 2D:
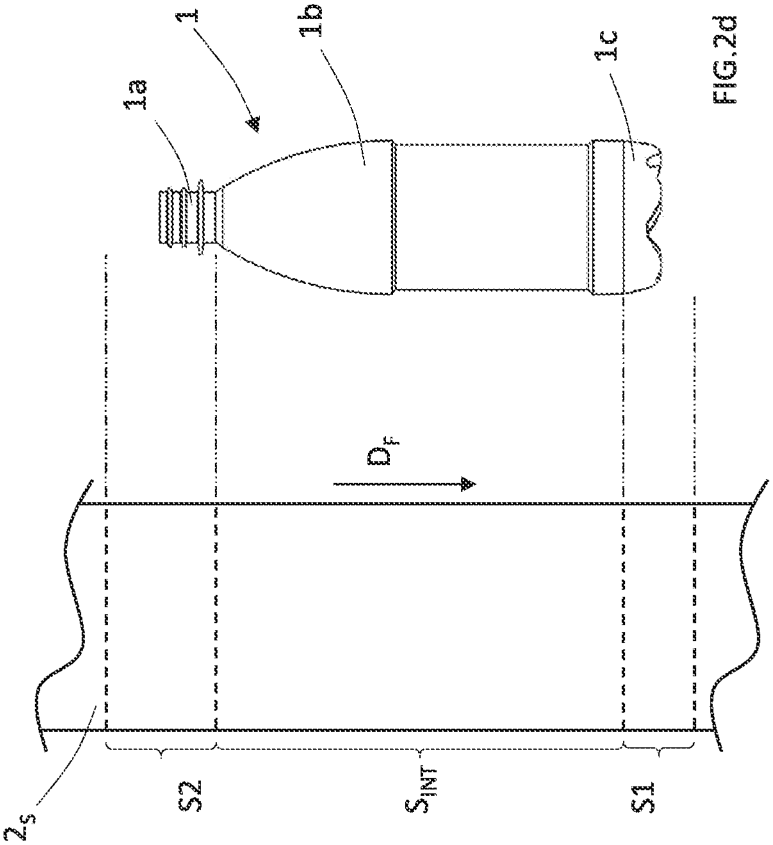
Figure 2C:
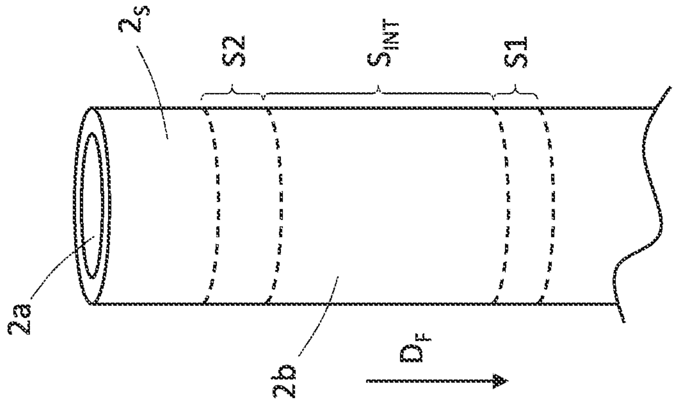
Figure 2F:
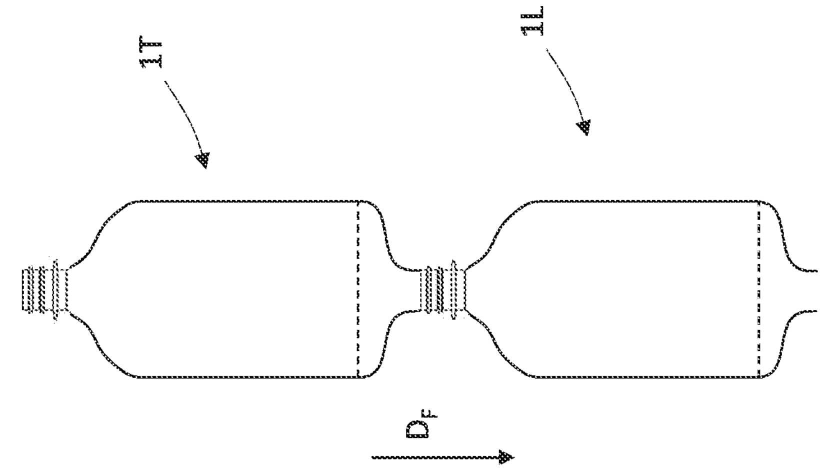
Figure 2E:
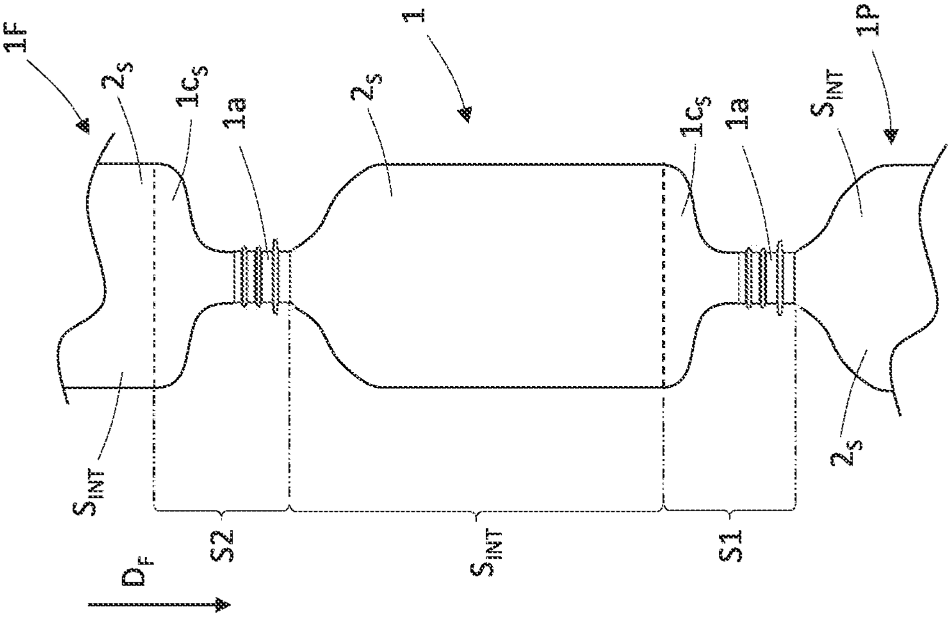

A shaped cellulose blank structure $2_S$ is schematically shown in FIG. 2*c*. The shaped cellulose blank structure $2_S$ is during the forming operation transported in the feeding direction $D_F$ through the first forming mould M1 and thereafter through the second forming mould M2. In FIG. 2*c*, the shaped cellulose blank structure $2_S$ is divided in a first section S1, an intermediate section $S_{INT}$, and a second section S2, as illustrated in FIG. 2*d*, where the different sections are used for forming different parts of each cellulose bottle 1. In the first sequential forming step, the first section S1 is fed to the first forming mould M1. The first section S1 of the shaped cellulose blank structure 2S is used for forming the semi-closed portion $1c_S$ of the cellulose bottle 1 simultaneously with forming the neck portion 1*a* of a directly preceding cellulose bottle 1P, as understood from FIG. 2*e*. Thereafter, in the second sequential forming step, the following second section S2 arranged at a distance from the first section S1 is fed to the first forming mould M1. The second section S2 of the shaped cellulose blank structure 2S is used for forming the neck portion 1*a* of the cellulose bottle 1 simultaneously with forming the semi-closed portion $1c_S$ of a directly following cellulose bottle 1F, as understood from FIG. 2*e*. The part of the shaped cellulose blank structure 2S shown in FIG. 2*e* is illustrating the configuration after the two sequential forming steps of forming operations in the first forming mould M1. As understood from FIG. 2*e*, the intermediate section $S_{INT}$ has not yet been shaped or formed in a forming mould after the two sequential steps of forming operations in the first forming mould M1. As described above, upon forming of the semi-closed bottom portion $1c_S$ in the first forming mould, the collar section $1c_C$ of the semi-closed bottom portion $1c_S$ is established by forces acting on the shaped cellulose blank structure $2_S$. The collar section $1c_C$ is defined as the most narrow portion of the semi-closed bottom portion $1c_S$ that is transitioning towards the neck portion 1*a*, as for example shown in FIG. 2*e*.

A row of cellulose bottles 1 are produced after each other from the shaped cellulose blank structure $2_S$, as understood from for example FIG. 2*e*. As indicated in FIG. 2*e*, consecutive cellulose bottles can be formed from the shaped cellulose blank structure 2S, which in the figure has been pre-shaped in the first forming mould M1 as described above. In FIG. 2*f*, the relationship between following cellulose bottles is illustrated, where a leading cellulose bottle 1L is directly followed by a trailing cellulose bottle 1T. The expressions leading and trailing are in this respect referring to the feeding direction $D_F$, and a leading cellulose bottle 1L is thus formed before a trailing cellulose bottle 1T in the first and second forming moulds. If referring to FIGS. 2*e-f*, the preceding cellulose bottle 1P illustrated in FIG. 2*e* is a leading cellulose bottle 1L relative to the directly succeeding cellulose bottle 1, and the cellulose bottle 1 is a trailing bottle relative to the preceding cellulose bottle 1P. If again referring to FIGS. 2*e-f*, the cellulose bottle 1 illustrated in FIG. 2*e* is a leading cellulose bottle 1L relative to the directly succeeding following cellulose bottle 1F, and the following cellulose bottle 1F is a trailing bottle relative to the cellulose bottle 1. The expressions above will be used in the following to define relationships in the cellulose bottle forming flow.

The second forming mould M2 is schematically illustrated in FIGS. 4*a-e*. The second forming mould M2 comprises openable and closable second mould parts 4*a*,4*b* forming a second forming cavity C2. A flexible membrane 6 is arranged in the second forming cavity C2, and the flexible membrane 6 is connected to and arranged in fluid communication with the pressure lance 5. The pressure lance 5 is suitably extending to or partly into the second forming cavity C2.

Figure 4A:
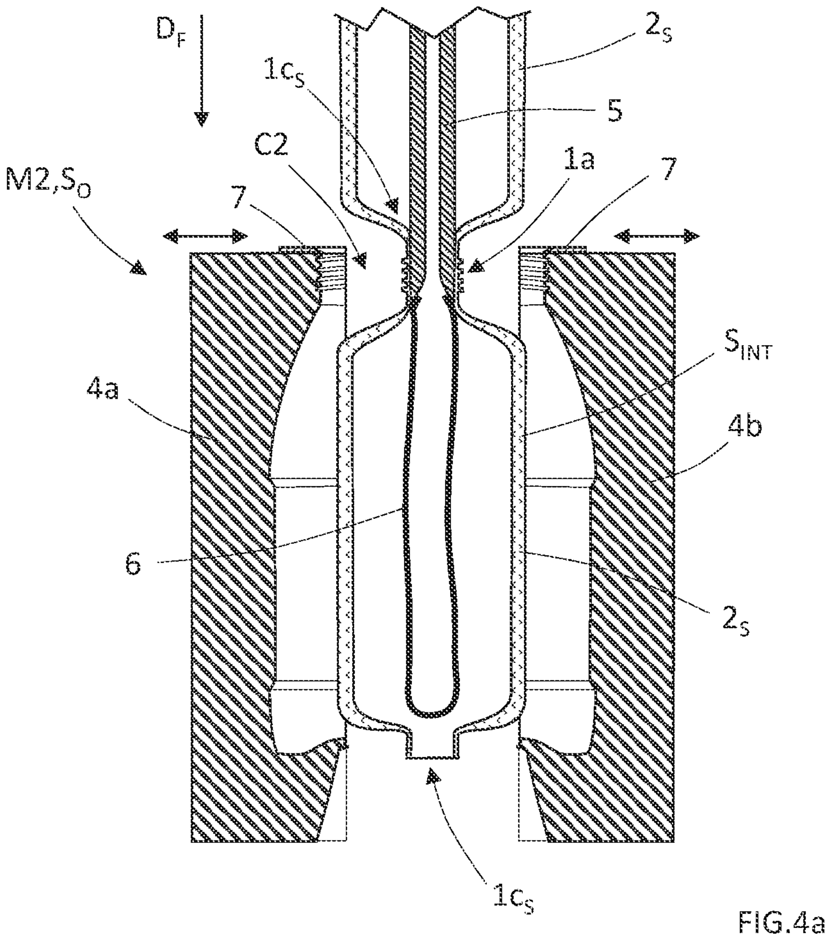
FIG. 4*a-e* show schematically, in side views, the second forming mould in different operational steps.
Figure 4B:
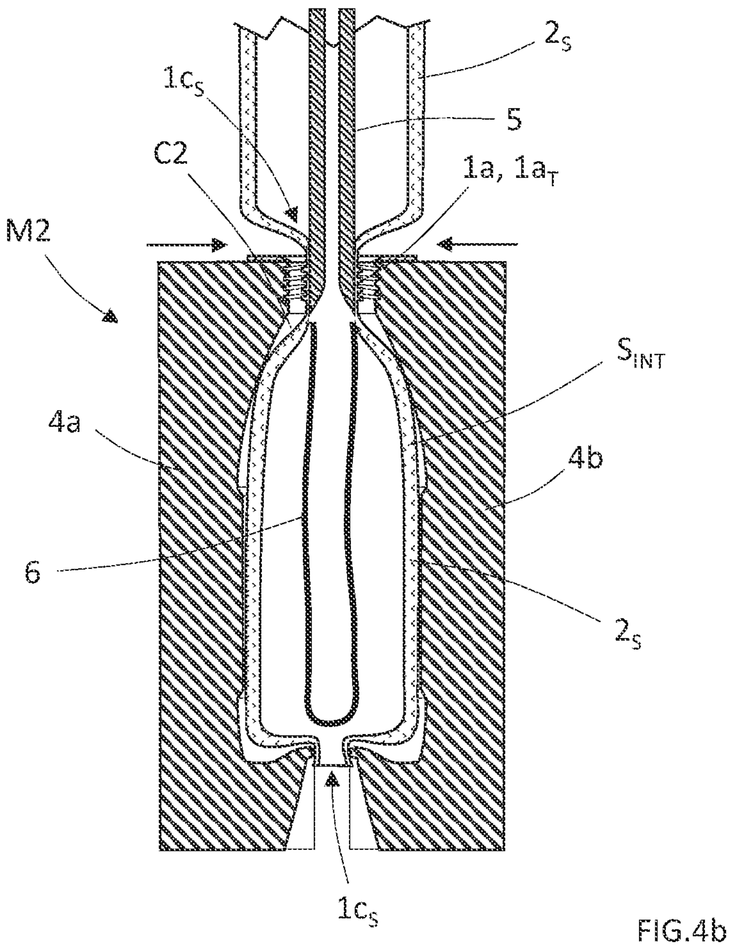
Figure 4C:
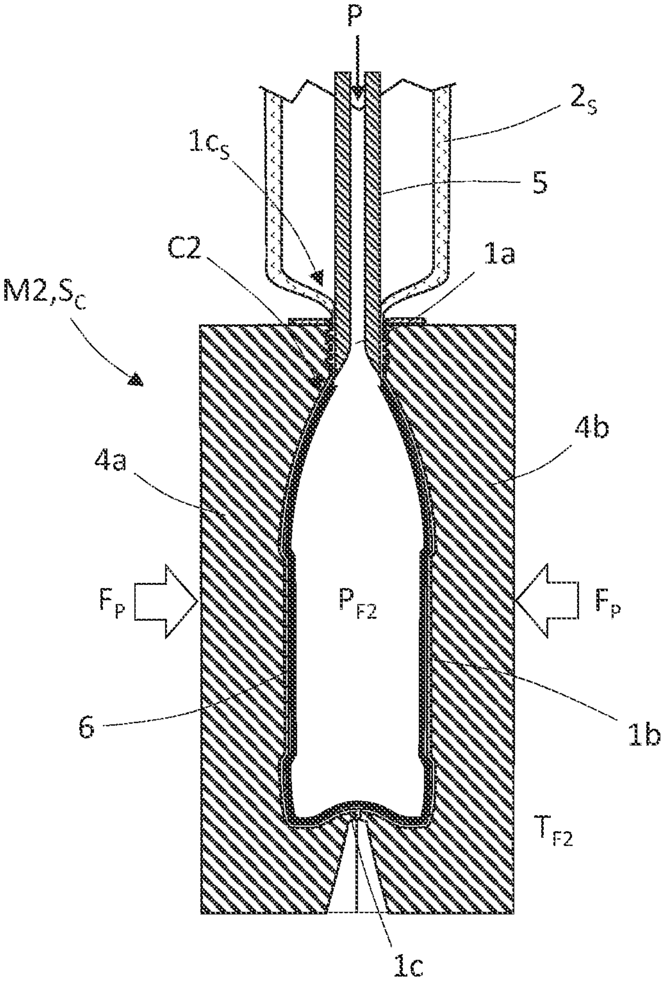
Figure 4D:
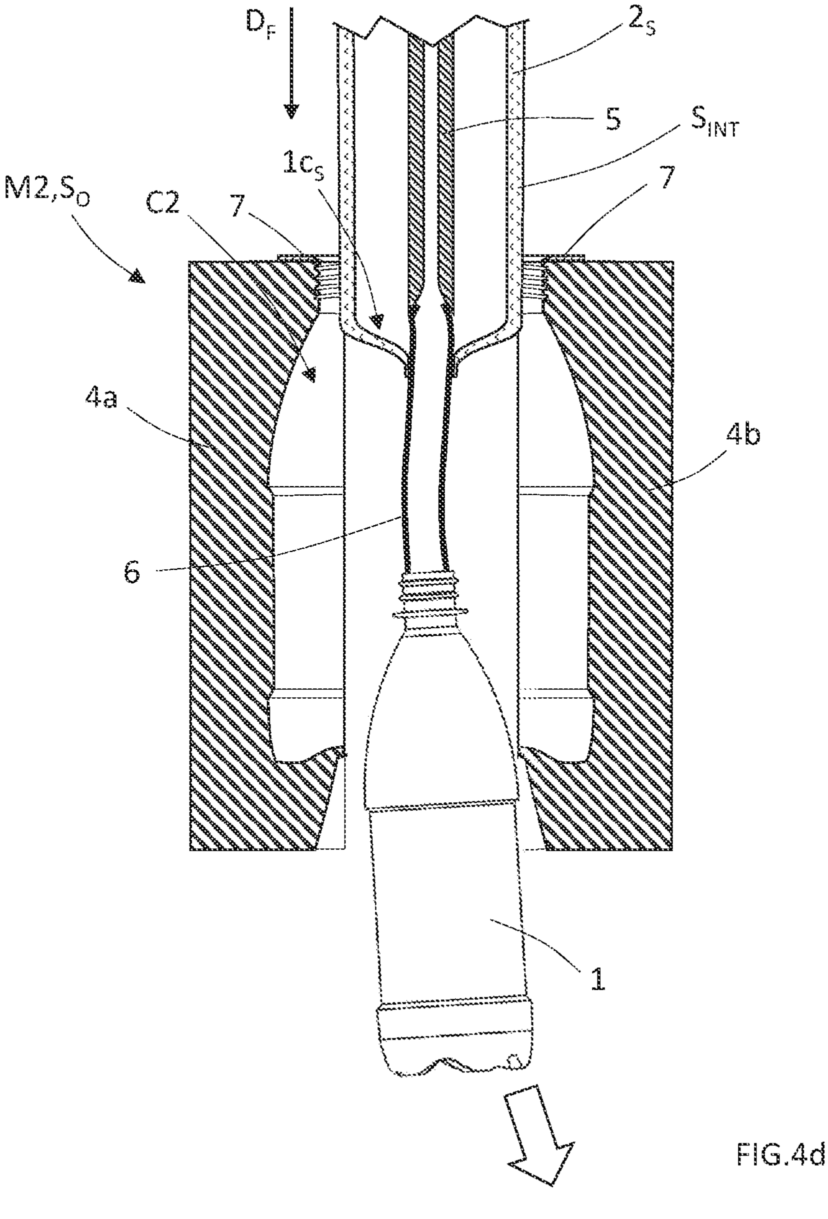

An outer second mould part 4*a* and an inner second mould part 4*b* are movably arranged relative to each other and relative to the flexible membrane 6, as indicated with the double arrows in FIGS. 1 and 4*a*. The outer second mould part 4*a* is suitably displaceable in reciprocating linear movements towards and away from the inner second mould part 4*b* and the flexible membrane 6. The inner second mould part 4*b* is suitably displaceable in reciprocating linear movements towards and away from the outer second mould part 4*a* and the flexible membrane 6. In FIG. 4*a*, the second forming mould M2 is arranged in an open state $S_O$, where the outer second mould part 4*a* and the inner second mould part 4*b* have been displaced in directions away from each other and away from the flexible membrane 6, allowing the shaped cellulose blank structure $2_S$ to be fed around the flexible membrane 6 and received between the second mould parts 4*a*,4*b*, as shown in FIG. 4*a*. In other non-illustrated embodiments, one of the outer second mould part 4*a* and the inner second mould part 4*b* may be arranged as a stationary mould part, where the other mould part is movably arranged.

The second forming mould M2 is forming the mid-portion 1*b* of the cellulose bottle 1 from the intermediate section $S_{INT}$, and the closed bottom portion 1*c* of the cellulose bottle 1 from the semi-closed bottom portion $1c_S$ in the second forming cavity C2. The feeding unit F is feeding the formed semi-closed bottom portion $1c_S$, the intermediate section $S_{INT}$, and the formed neck portion 1*a* around the pressure lance 5 in the feeding direction $D_F$ from the first forming mould M1 towards the second forming mould M2 when the first mould parts 3$a$,3$b$ and the second mould parts 4$a$,4$b$ are arranged in open states $S_O$. The feeding unit F is in this way feeding the formed semi-closed bottom portion 1$c_S$ and the intermediate section $S_{INT}$ of the shaped cellulose blank structure $\mathbf{2}_S$ between the formed semi-closed bottom portion 1$c_S$ and a directly following formed trailing neck portion 1$a_T$ to the second forming mould M2, as shown in FIG. 4$a$.

When the semi-closed bottom portion 1$c_S$ and the intermediate section $S_{INT}$ is arranged in the position shown in FIG. 4$a$, and thus positioned between the outer second mould part 4$a$ and the inner second mould part 4$b$, with the flexible membrane 6 arranged inside the shaped cellulose blank structure $\mathbf{2}_S$, the outer second mould part 4$a$ and the inner second mould part 4$b$ are displaced towards each other for arranging the second forming mould M2 into a closed state $S_C$, as shown in FIGS. 4$b$-$c$. Upon displacement of the outer second mould part 4$a$ and the inner second mould part 4$b$ towards each other, the mould parts are pushing the semi-closed bottom portion 1$c_S$ towards a closed configuration, as shown in FIGS. 4$b$-$c$ and illustrated more in detail in FIG. 4$e$. The outer second mould part 4$a$ and the inner second mould part 4$b$ are gripping the collar section 1$c_C$ of the semi-closed bottom portion 1$c_S$ when moved towards each other for an efficient forming process. In this way, the collar opening 1$c_O$ of the semi-closed bottom portion 1$c_S$ is closed by the forces exerted by the second mould parts 4$a$,4$b$.

The movements of the outer second mould part 4$a$ and the inner second mould part 4$b$ towards the closed state $S_C$ are indicated with arrows in FIG. 4$b$. The outer second mould part 4$a$ and the inner second mould part 4$b$ are in this way pushed towards each other for closing the second forming mould M2. Upon further movement of the outer second mould part 4$a$ and the inner second mould part 4$b$ the second mould parts are arranged in contact with each other, and the second forming mould M2 is arranged in the closed state $S_C$, as shown in FIG. 4$c$. To secure the closed state $S_C$ of the second forming mould M2 during the forming process, the outer second mould part 4$a$ and the inner second mould part 4$b$ are pushed towards each other with suitable pushing forces $F_P$, as shown in FIG. 4$c$. During the movements of the outer second mould part 4$a$ and the inner second mould part 4$b$, the semi-closed bottom portion 1$c_S$ is further closed by the second mould parts, as described above and understood from FIGS. 4$b$-$c$.

In the closed state $S_C$, the second mould parts 4$a$,4$b$ together with the flexible membrane 6 are forming the closed bottom portion 1$c$ and the mid-portion 1$c$ of the cellulose bottle 1 by inflating the flexible membrane 6 towards the second mould parts 4$a$,4$b$ as understood from FIG. 4$c$. The flexible membrane 6 is inflated with a pressure medium P entering from the pressure lance 5, as indicated with the arrow in FIG. 4$c$. Thus, when the second mould parts 4$a$,4$b$ are closed around the semi-closed bottom portion 1$c_S$ and the intermediate section $S_{INT}$, the further closed semi-closed bottom portion 1$c_S$ and the intermediate section $S_{INT}$ are pressed against the second mould parts 4$a$,4$b$ by means of the inflated flexible membrane 6 for forming the cellulose bottle 1. In this way, the flexible membrane 6 when inflated by the pressure medium P is applying a second forming pressure $P_{F2}$ onto the intermediate section $S_{INT}$ and the further closed semi-closed bottom portion 1$c_S$. Further, the applied second forming pressure $P_{F2}$ together with an applied second forming temperature $T_{F2}$ onto the further closed semi-closed bottom portion 1$c_S$ and the intermediate section $S_{INT}$ are forming the closed bottom portion 1$c$ and the mid-portion 1$c$ of the cellulose bottle 1 into rigid structures.

The bottom of the formed rigid closed bottom portion 1$c$ of the cellulose bottle has an inwardly curved surface configuration, as understood from for example FIGS. 1$b$, 4$c$, and 4$e$. The closed collar section 1$c_C$ of the semi-closed bottom portion 1$c_S$ is in this way arranged above the lowermost portions of the cellulose bottle 1, as shown in FIG. 4$e$. The inwardly curved surface configuration is enabled by the shape of the second mould parts 4$a$,4$b$ and the inflation of the flexible membrane 6 upon forming in the second forming mould M2, where the flexible membrane is pushing the semi-closed bottom portion 1$c_S$ towards the second forming moulds 4$a$,4$b$. The inwardly curved surface configuration is providing a stable bottom structure of the cellulose bottle 1. The cellulose bottle 1 has with this construction a high stability when placed on an object surface, such as for example a table surface or other surface.

The already formed upper portion 1$a$ is as understood from FIGS. 4$a$-$e$ arranged within the second forming mould M2 during the forming operation. It should however be understood that no forming pressure is applied to the upper portion 1$a$ in the second forming mould M2 during the forming of the cellulose bottle 1.

The applied second forming pressure $P_{F2}$ is suitably in the range of 1-100 MPa, preferably 4-20 MPa, and the applied second forming temperature $T_{F2}$ is suitably in the range of 100-300° C., preferably 100-200° C.

After the forming operation, the second forming mould M2 is returned to the open state $S_O$, as shown in FIG. 4$d$, for an easy removal of the cellulose bottle 1 and for repeating the forming operation.

The second mould parts 4$a$,4$b$ of the second forming mould M2 are suitably arranged as stiff mould parts. With stiff mould parts is meant that the mould parts are made of a stiff material with limited deformation capabilities, such as for example steel, aluminium, composite materials or a combination of different materials.

The second mould part M2 may further comprise a heating unit. The heating unit is configured for applying the second forming temperature $T_{F2}$ onto the shaped cellulose blank structure $\mathbf{2}_S$ and the semi-closed bottom portion 1$c_S$ during the forming operation in the second forming mould M2. The heating unit may have any suitable configuration. The heating unit may be integrated in or cast into the second mould parts 4$a$,4$b$, and suitable heating devices are e.g. electrical heaters, such as resistor elements, or fluid heaters. Other suitable heat sources may also be used.

The flexible membrane 6 is made of a material that is allowed to deform when being inflated upon forming of the cellulose bottles 1 in the second forming mould M2. Suitable materials are for elastomeric compositions, such as for example rubber, or other elastomers exhibiting elastic or rubber-like properties. The material used in the flexible membrane 6 suitably withstands high pressure levels from the pressure medium P when being inflated, as well as repeated inflation and deflation cycles.

The pressure medium P is used for establishing the second forming pressure $P_{F2}$ in the second forming cavity C2 upon inflating the flexible membrane 6. The pressure medium P used in the forming operation in the second forming mould M2 may be a liquid composition or a gas, such as for example oil, water, or air.

The bottle forming unit U comprises a fluid control device D, as schematically indicated in FIG. 1. The pressure lance 5 is at a first end 5$a$ arranged in fluid communication with the fluid control device D, and the pressure lance 5 is at a second end 5*b* arranged in fluid communication with the flexible membrane 6. The fluid control device D is configured for inflating the flexible membrane 6 with the pressure medium P via the pressure lance 5 upon forming in the second forming mould M2. The fluid control device D is further arranged for deflating the flexible membrane 6 via the pressure lance 5 after the forming operation in the second forming mould M2. The fluid control device may have any suitable configuration, and may comprise hydraulic or pneumatic cylinders, fluid pumps, compressors, or other pressure establishing devices for delivering pressurized pressure medium to the flexible membrane via the pressure lance 5. The bottle forming unit U may further comprise a control unit for controlling the forming operation.

Figure 4E:
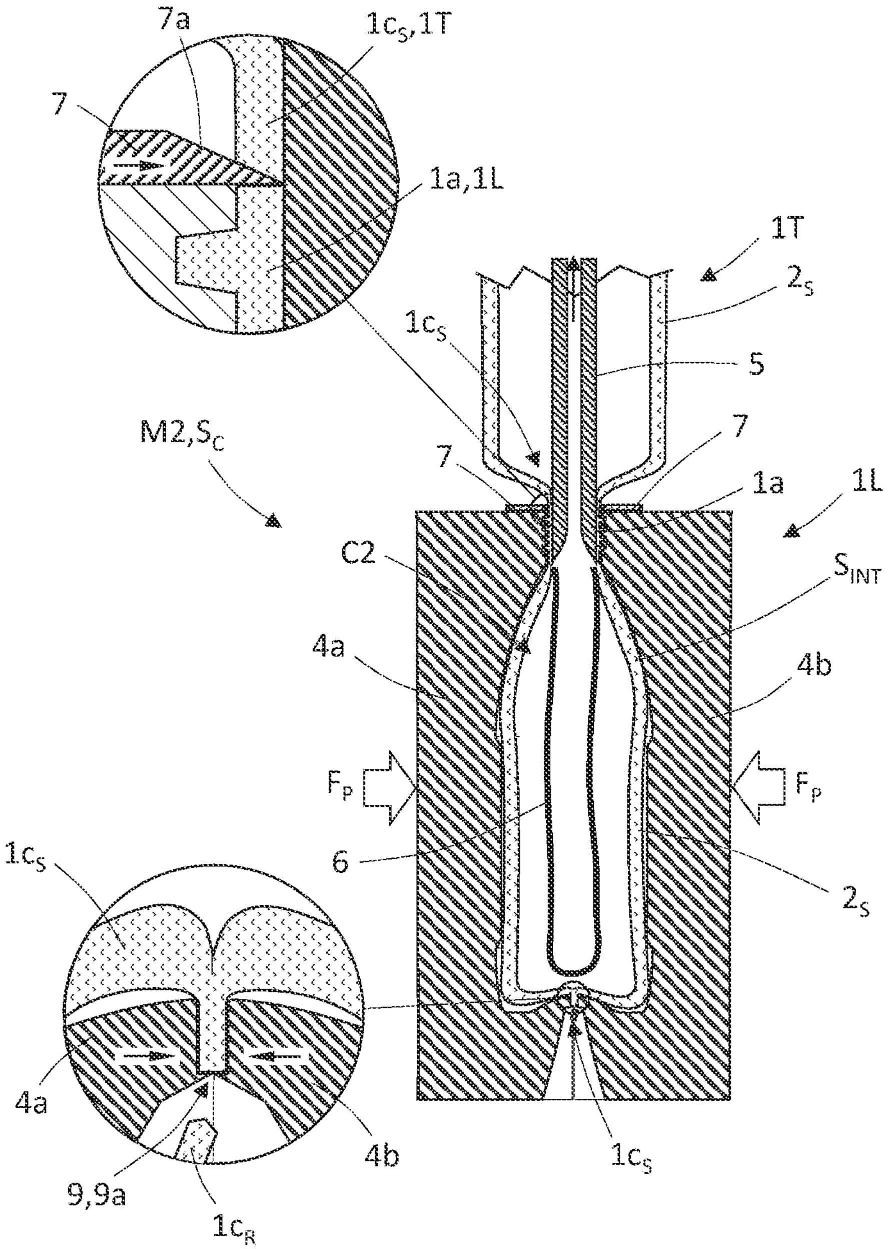

The bottle forming unit U further comprises a cutting device 7 arranged in the second mould part M2 or in connection to the second mould part M2. In the embodiment illustrated in FIGS. 4*a-e,* the cutting device 7 is arranged in the second mould part M2. The cutting device 7 may be arranged with cutting edges 7*a* on the outer second mould part 4*a* and the inner second mould part 4*b* respectively as shown in FIG. 4*e*. The cutting device 7 is cutting off the formed neck portion 1*a* of a leading cellulose bottle 1L from the semi-closed bottom portion 1$c_S$ of a directly following trailing cellulose bottle 1T by means of the cutting device 7 upon closing of the second forming mould M2 during the forming operation of the cellulose bottle 1 in the second forming mould M2, as shown in FIG. 4*e*. In FIG. 4*e,* the second forming mould M2 is illustrated in the closed state before the inflation of the flexible membrane 6 with the pressure medium P, and the cutting operation is suitably completed when the second mould part M2 is closed.

According to the embodiment shown in FIGS. 4*a-d,* the pressure lance 5 extends into the second forming mould M2. The cutting device 7 may be arranged to work against and around the pressure lance 5 such that the pressure lance 5 acts as an anvil against which the cutting edges 7*a* are pressed, and the neck portion 1*a* is in this way separated from the semi-closed bottom portion 1$c_S$ accordingly. Here, the pressure lance 5 may comprise a reinforced portion that can withstand the pressure from the cutting edge. The reinforced portion can be arranged as a thicker material portion of the pressure lance 5 and/or can be made from a different material than adjacent portions of the pressure lance 5. As an alternative, the entire pressure lance 5 is made from a suitable material than can withstand pressure, both in the first forming mould M1 and the second forming mould M2. The reinforced portion can alternatively be arranged as a separate piece of material arranged around the pressure lance 5.

The bottle forming unit U may further comprise an auxiliary cutting device 9 arranged in the second mould part M2, as illustrated in FIG. 4*e*. The auxiliary cutting device 9 may be arranged with cutting edges 9*a* on the outer second mould part 4*a* and the inner second mould part 4*b* respectively as indicated in FIG. 4*e*. The auxiliary cutting device 9 is cutting off residual parts 1$c_R$ of the closed collar section 1$c_C$ of the semi-closed bottom portion 1$c_S$ that may extend out from the second forming mould M2 when arranged in the closed state $S_C$.

The dry-forming process of the cellulose bottle 1 will be described below in connection to FIGS. 5*a-f.* Throughout the dry-forming process, the dry-formed cellulose blank structure 2 is shaped into a shaped cellulose blank structure 2$_S$, where the shaped cellulose blank structure 2$_S$ has a tube-like configuration as described above.

Figure 5A:
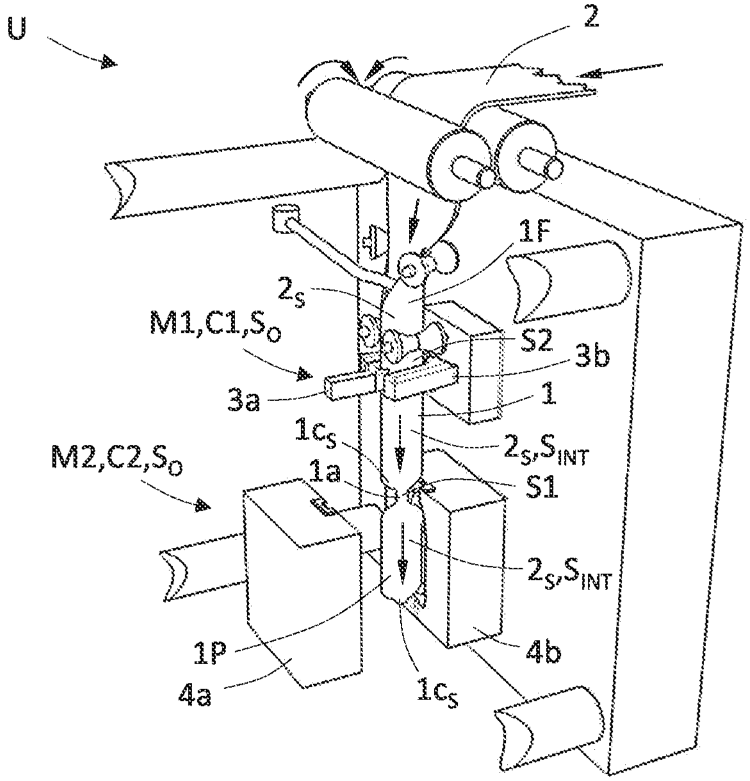
FIG. 5*a-f* show schematically, in perspective views, the bottle forming unit with the first forming mould and the second forming mould in different operational steps.

In FIG. 5*a,* the first forming mould M1 is arranged in the open state $S_O$ and the second forming mould M2 is arranged in the open state $S_O$. The position in FIG. 5*a* is illustrating a position after the first sequential forming step in the first forming mould M1 and before the second sequential forming step in the first forming mould M1 for forming the cellulose bottle 1. In this position shown in FIG. 5*a,* the first section S1 of the shaped cellulose blank structure 2$_S$ has already been fed to and further transported from the first forming mould M1, where the semi-closed bottom portion 1$c_S$ of the cellulose bottle 1 together with the neck portion 1*a* of the directly preceding cellulose bottle 1P were simultaneously formed from the first section S1 in the first forming mould M1. In the first sequential forming step, the shaped cellulose blank structure 2$_S$ was fed around the pressure lance 5 and through the first mould parts 3*a*,3*b*. Thereafter, the feeding of the shaped cellulose blank structure 2$_S$ was stopped when the first section S1 of the shaped cellulose blank structure 2$_S$ was arranged in a position aligned with the first mould parts 3*a*,3*b*. Then, the first mould parts 3*a*,3*b* were closed and the first section S1 was pressed against the pressure lance 5 by means of the first mould parts 3*a*,3*b* for forming the semi-closed bottom portion 1$c_S$ of the cellulose bottle 1 in the first forming cavity C1, and simultaneously forming the neck portion 1*a* of the directly preceding cellulose bottle 1P in the first forming cavity C1. Upon forming of the semi-closed bottom portion 1$c_S$ of the cellulose bottle 1 in the first forming mould M1, the first forming pressure $P_{F1}$ and the first forming temperature $T_{F1}$ were applied onto at least the part of the first section S1 of the shaped cellulose blank structure 2$_S$ used for forming the neck portion 1*a* of the preceding cellulose bottle 1P. It should be understood that the first forming pressure $P_{F1}$ and the first forming temperature $T_{F1}$ also may be applied to at least a part of the first section S1 used for forming the semi-closed bottom portion 1$c_S$ for a more structurally rigid formation of the semi-closed bottom portion 1$c_S$. The first forming pressure $P_{F1}$ and the first forming temperature $T_{F1}$ may for example be applied to the established collar section 1$c_C$ of the semi-closed bottom portion 1$c_S$.

In the position shown in FIG. 5*a,* the following second section S2 of the shaped cellulose blank structure 2$_S$ has been fed to the first forming mould M1, and at the same time the formed neck portion 1*a,* the intermediate section $S_{INT}$, and the semi-closed bottom portion 1$c_S$, of the preceding cellulose bottle 1P have been fed to the second forming mould M2. When opening the first mould parts 3*a*,3*b,* the shaped cellulose blank structure 2$_S$ was fed around the pressure lance 5 and through the first mould parts 3*a*,3*b*. Thereafter, the feeding of the shaped cellulose blank structure 2$_S$ was stopped when the second section S2 of the shaped cellulose blank structure 2$_S$ is arranged in a position aligned with the first mould parts 3*a*,3*b,* as understood from FIG. 5*a*.

Figure 5B:
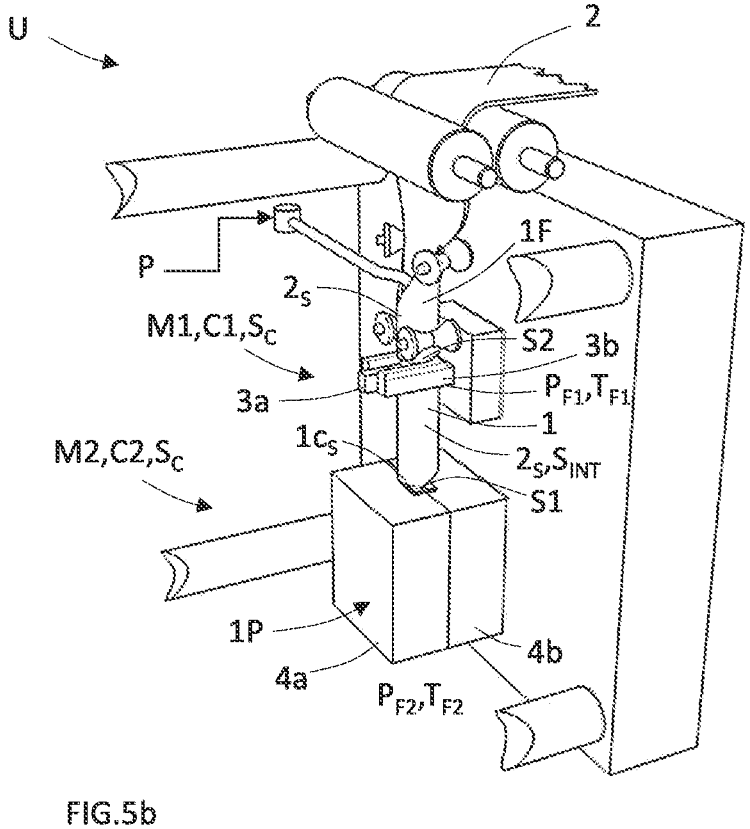

In FIG. 5*b,* the first forming mould M1 is arranged in the closed state $S_C$ and the second forming mould M2 is arranged in the closed state $S_C$. The position of the shaped cellulose blank structure 2$_S$ in FIG. 5*b,* is illustrating a position in the first forming mould M1 during the second sequential forming step for forming the neck portion 1*a* of the cellulose bottle 1 and the semi-closed bottom portion 1$c_S$ of a directly following cellulose bottle 1F, and a position in the second forming mould M2 where the preceding bottle 1P is formed. In this position shown in FIG. 5*b,* the neck portion 1*a* of the cellulose bottle 1 is formed simultaneously with the semi-closed bottom portion 1$c_S$ of a directly following cellulose bottle 1F from the second section S2 in the first forming mould M1. After closing of the first mould parts 3*a*,3*b*, the second section S2 is pressed against the pressure lance 5 by means of the first mould parts 3*a*,3*b* for forming the neck portion 1*a* of the cellulose bottle 1 in the first forming cavity C1, simultaneously with forming the semi-closed bottom portion $1c_S$ of the directly following cellulose bottle 1F in the first forming cavity C1. Upon forming of the neck portion 1*a* of the cellulose bottle 1 in the first forming mould M1, the first forming pressure $P_{F1}$ and the first forming temperature $T_{F1}$ are applied onto at least the part of the second section S2 of the shaped cellulose blank structure $2_S$ used for forming a structurally rigid neck portion 1*a* of the cellulose bottle 1. The threaded section 1*d* of the neck portion 1*a* is established by the threaded section 3*c* upon forming of the neck portion 1*a* in the first forming mould M1. It should be understood that the first forming pressure $P_{F1}$ and the first forming temperature $T_{F1}$ also may be applied to the at least a part of the second section S2 used for forming the semi-closed bottom portion $1c_S$ of the directly following cellulose bottle 1F for a more structurally rigid formation of the semi-closed bottom portion $1c_S$. The first forming pressure $P_{F1}$ and the first forming temperature $T_{F1}$ may for example be applied to the established collar section $1c_C$ of the semi-closed bottom portion $1c_S$ of the directly following cellulose bottle 1F.

Figure 5C:
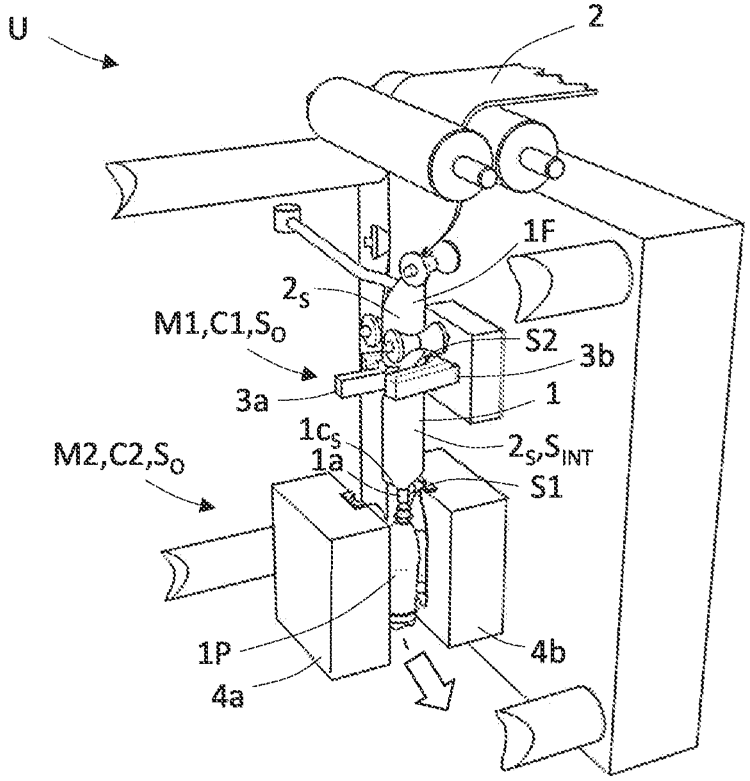
Figure 5D:
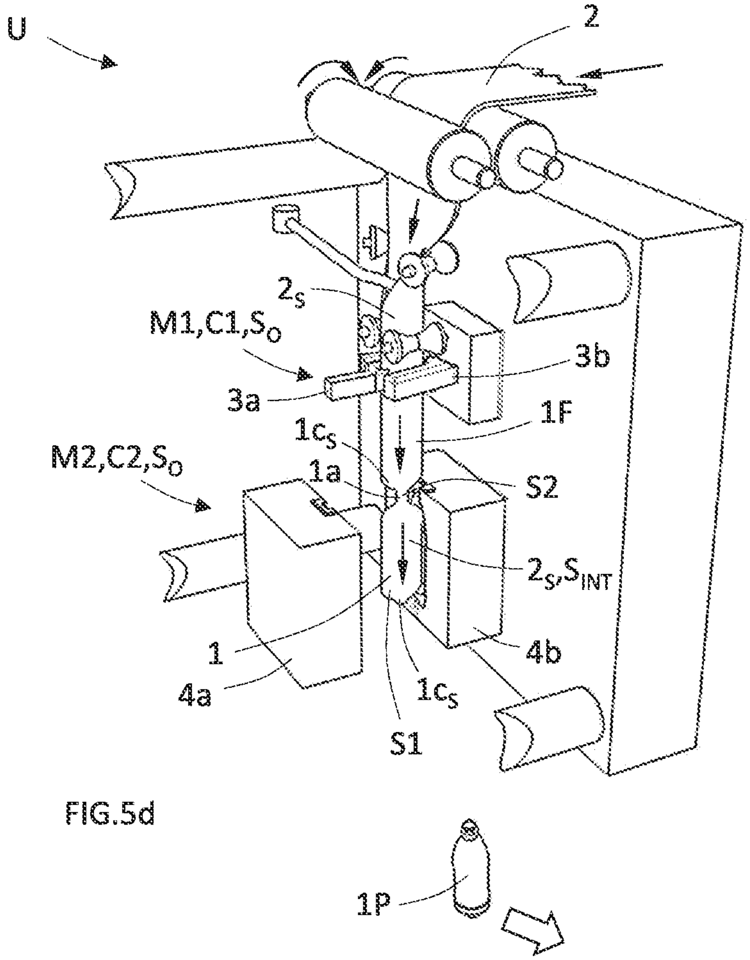

In FIG. 5*c*, the first forming mould M1 and the second forming mould M2 have returned to the open states $S_O$. In FIG. 5*c*, the formed preceding bottle 1P can be removed from the second forming mould M2, as indicated with the arrow. Thereafter, the formed semi-closed bottom portion $1c_S$ of the cellulose bottle 1 and an intermediate section $S_{INT}$ of the shaped cellulose blank structure $2_S$ between the formed semi-closed bottom portion $1c_S$ of the cellulose bottle 1 and the formed neck portion 1*a* of the cellulose bottle 1 is fed to the second forming mould M2, as shown in FIG. 5*d*.

Figure 5E:
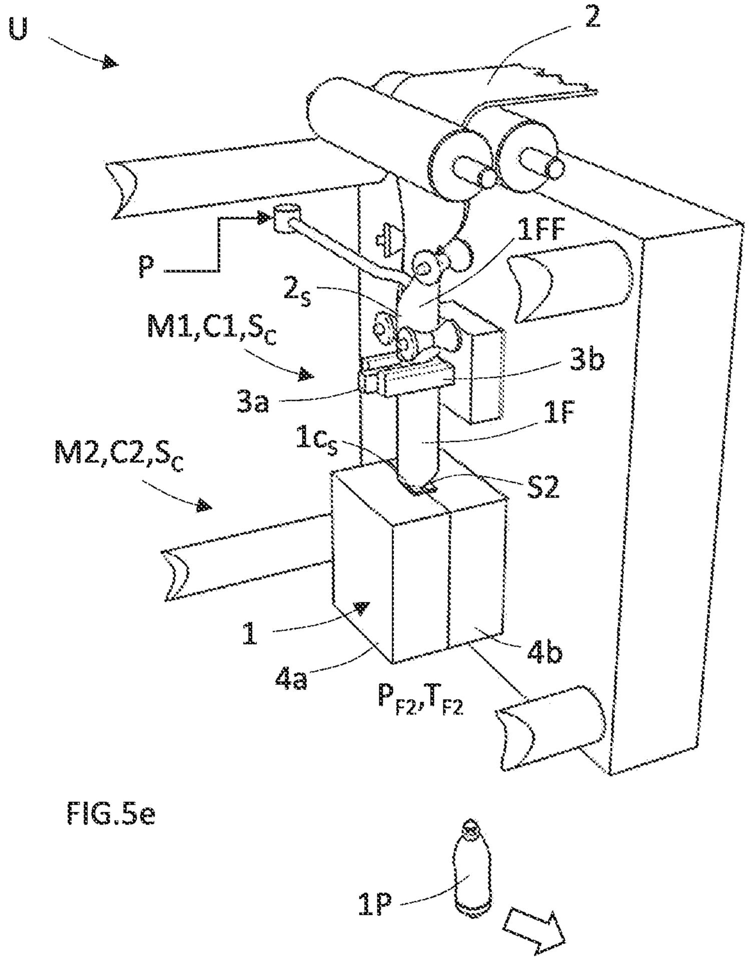
Figure 5F:
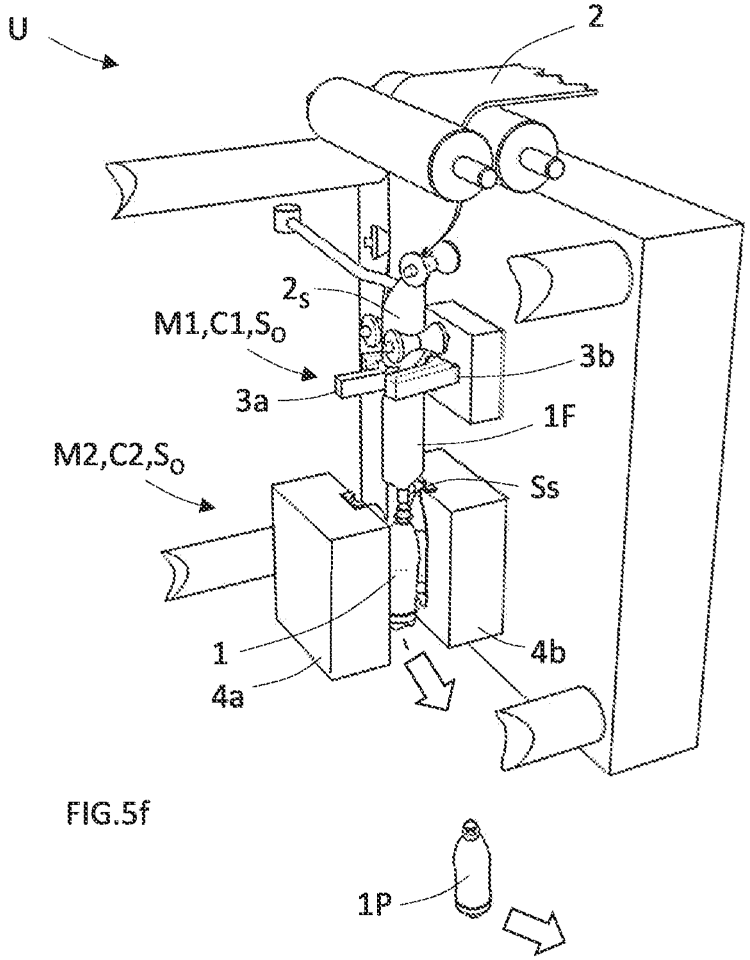

In the second forming mould M2, the mid-portion 1*b* of the cellulose bottle 1 is formed from the intermediate section $S_{INT}$ and the closed bottom portion 1*c* of the cellulose bottle 1 is formed from the semi-closed bottom portion $1c_S$. To form the cellulose bottle 1 in the third sequential forming step in the second forming mould M2, the semi-closed bottom portion $1c_S$ and the intermediate section $S_{INT}$ is fed around the pressure lance 5 into the second forming mould M2, as shown in FIG. 5*d*. The feeding of the semi-closed bottom portion $1c_S$ and the intermediate section $S_{INT}$ is stopped when positioned between the open second mould parts 4*a*,4*b*, as shown in FIG. 5*d*. Thereafter the second mould parts 4*a*,4*b* are closed around the semi-closed bottom portion $1c_S$ and the intermediate section $S_{INT}$ and the flexible membrane 6 is inflated with the pressure medium P entering from the pressure lance 5, as shown in FIG. 5*e*. The second forming pressure $P_{F2}$ is applied onto the semi-closed bottom portion $1c_S$ and the intermediate section $S_{INT}$ by pressing the semi-closed bottom portion $1c_S$ and the intermediate section $S_{INT}$ against the second mould parts 4*a*,4*b* by means of the inflated flexible membrane 6. The second forming temperature $T_{F2}$ is applied onto the semi-closed bottom portion $1c_S$ and the intermediate section $S_{INT}$, for forming the closed bottom portion 1*c* and the mid-portion 1*c* of the cellulose bottle 1 into rigid structures. The earlier formed neck portion 1*a* of the cellulose bottle 1 is cut off from the semi-closed bottom portion $1c_S$ of the directly following cellulose bottle 1F by means of the cutting device 7 during the forming of the cellulose bottle 1 in the second forming mould M2. In FIG. 5*e*, the neck portion 1*a* of the following bottle 1F is formed in the first forming mould M1 together with the semi-closed bottom portion of a further following cellulose bottle 1FF. After the forming operation, the flexible membrane 6 is deflated and the second mould parts 4*a*,4*b* are opened for removal of the formed cellulose bottle 1 from the second forming mould M2, as shown in FIG. 5*f*. A negative pressure may be applied to the flexible membrane 6 for an efficient deflating operation.

In one embodiment, the first mould parts 3*a*,3*b* and the second mould parts 4*a*,4*b* are simultaneously closed. In other embodiments, the first mould parts 3*a*,3*b* and the second mould parts 4*a*,4*b* are non-simultaneously closed.

Figure 6:
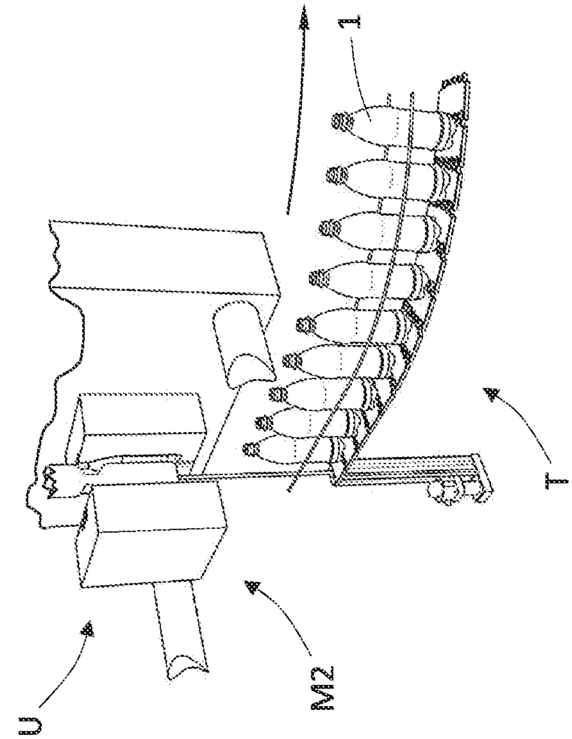
FIG. 6 shows schematically in a perspective view a transporting unit for transportation of formed cellulose bottles away from the second forming mould.

The bottle forming unit U may further be arranged with a transporting unit T for transportation of formed cellulose bottles 1 away from the second forming mould M2, as shown in FIG. 6.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

1: Cellulose bottle
1*a*: Neck portion
$1a_I$: Inner surface
$1a_O$: Flow opening
$1a_{OU}$: Outer surface
$1a_T$: Trailing neck portion
1*b*: Mid-portion
1*c*: Closed bottom portion
$1c_C$: Collar section
$1c_L$: Lowest part
$1c_O$: Collar opening
$1c_S$: Semi-closed bottom portion
1*d*: Threaded section
1*e*: Seam section
1F: Following cellulose bottle
1L: Leading cellulose bottle
1P: Preceding cellulose bottle
1T: Trailing cellulose bottle
2: Cellulose blank structure
2*a*: Inner surface
2*b*: Outer surface
2*c*: Side edge
$2_S$: Shaped cellulose blank structure
3*a*: Outer first mould part
3*b*: Inner first mould part
3*c*: Thread forming section
4*a*: Outer second mould part

4*b:* Inner second mould part
5: Pressure lance
5*a:* First end
5*b:* Second end
6: Flexible membrane
7: Cutting device
8: Deflecting rollers
9: Auxiliary cutting device
A: Pivoting axis
C1: First forming cavity
C2: Second forming cavity
D: Fluid control device
F: Feeding unit
$F_P$: Pushing force
M1: First forming mould
M2: Second forming mould
O: Overlapping tube-like configuration
P: Pressure medium
$P_F$: Forming pressure
S: Shaping unit
S1: First section
S2: Second section
$S_C$: Closed state
$S_{INT}$: Intermediate section
$S_O$: Open state
T: Transportation unit
$T_F$: Forming temperature
U: Bottle forming unit

The invention claimed is:

1. A bottle forming unit for dry-forming at least a part of a cellulose bottle from an air-formed cellulose blank structure, wherein the bottle forming unit comprises a feeding unit, a shaping unit and a first forming mould, wherein the shaping unit is configured for shaping the dry-formed cellulose blank structure into a shaped cellulose blank structure having a tube-like configuration with an inner surface and an outer surface, wherein the feeding unit is configured for feeding the shaped cellulose blank structure to the first forming mould, wherein the first forming mould is configured for forming a neck portion of a leading cellulose bottle simultaneously with forming a semi-closed bottom portion of a directly following trailing cellulose bottle from the shaped cellulose blank structure, wherein the first forming mould comprises openable and closable first mould parts arranged around a pressure lance, wherein a first forming cavity is formed between the first mould parts and the pressure lance, wherein the feeding unit is configured for feeding the shaped cellulose blank structure around the pressure lance and through the first mould parts when the first mould parts are open, wherein the first mould parts when closed are configured for pressing the shaped cellulose blank structure against the pressure lance for simultaneously forming the neck portion and the semi-closed bottom portion in the first forming cavity.

2. The bottle forming unit according to claim 1, wherein the bottle forming unit further comprises a second forming mould, wherein the feeding unit is configured for feeding the formed semi-closed bottom portion and an intermediate section of the shaped cellulose blank structure between the formed semi-closed bottom portion and a directly following formed trailing neck portion to the second forming mould, wherein the second forming mould is configured for forming a mid-portion from the intermediate section and forming a closed bottom portion from the semi-closed bottom portion.

3. The bottle forming unit according to claim 2, wherein the second forming mould comprises openable and closable second mould parts forming a second forming cavity, wherein a flexible membrane connected to and arranged in fluid communication with the pressure lance is arranged in the second forming cavity, wherein the feeding unit is configured for feeding the semi-closed bottom portion and the intermediate section around the pressure lance into the second forming mould when the first mould parts and the second mould parts are open, wherein the second mould parts together with the flexible membrane, when the second mould parts are closed around the semi-closed bottom portion and the intermediate section, are configured for forming the closed bottom portion and the mid-portion by inflating the flexible membrane with a pressure medium entering from the pressure lance, wherein the semi-closed bottom portion and the intermediate section are pressed against the second mould parts by means of the inflated flexible membrane.

4. The bottle forming unit according to claim 3, wherein the pressure lance is extending to or partly into the second forming cavity.

5. The bottle forming unit according to claim 3, wherein the bottle forming unit comprises a fluid control device, wherein the pressure lance at a first end is arranged in fluid communication with the fluid control device, and wherein the pressure lance at a second end is arranged in fluid communication with the flexible membrane, wherein the fluid control device is configured for inflating the flexible membrane with the pressure medium via the pressure lance.

6. The bottle forming unit according to claim 3, wherein the bottle forming unit further comprises a cutting device arranged in the second mould parts or in connection to the second mould parts, wherein the cutting device is configured for cutting off the formed neck portion of a leading cellulose bottle from the semi-closed bottom portion of the directly following trailing cellulose bottle by means of the cutting device during the forming of the cellulose bottle in the second forming mould.

7. The bottle forming unit according to claim 1, wherein the first forming mould comprises a thread forming section configured for forming a threaded section of the neck portion upon forming of the neck portion in the first forming mould.

8. A bottle forming unit for dry-forming at least a part of a cellulose bottle from an air-formed cellulose blank structure, wherein the bottle forming unit comprises a feeding unit, a shaping unit and a first forming mould, wherein the shaping unit is configured for shaping the dry-formed cellulose blank structure into a shaped cellulose blank structure having a tube-like configuration with an inner surface and an outer surface, wherein the feeding unit is configured for feeding the shaped cellulose blank structure to the first forming mould, wherein the first forming mould is configured for forming a neck portion of a leading cellulose bottle simultaneously with forming a semi-closed bottom portion of a directly following trailing cellulose bottle from the shaped cellulose blank structure, wherein the bottle forming unit further comprises a second forming mould, wherein the feeding unit is configured for feeding the formed semi-closed bottom portion and an intermediate section of the shaped cellulose blank structure between the formed semi-closed bottom portion and a directly following formed trailing neck portion to the second forming mould, wherein the second forming mould is configured for forming a mid-portion from the intermediate section and forming a closed bottom portion from the semi-closed bottom portion, wherein the second forming mould comprises openable and closable second mould parts forming a second forming cavity, wherein a flexible membrane connected to and arranged in fluid communication with a pressure lance is arranged in the second forming cavity, wherein the feeding unit is configured for feeding the semi-closed bottom portion and the intermediate section around the pressure lance into the second forming mould when the first mould parts and the second mould parts are open, wherein the second mould parts together with the flexible membrane, when the second mould parts are closed around the semi-closed bottom portion and the intermediate section, are configured for forming the closed bottom portion and the mid-portion by inflating the flexible membrane with a pressure medium entering from the pressure lance, wherein the semi-closed bottom portion and the intermediate section are pressed against the second mould parts by means of the inflated flexible membrane.

* * * * *